(12) United States Patent
Kawanishi et al.

(10) Patent No.: US 8,270,780 B2
(45) Date of Patent: Sep. 18, 2012

(54) OPTICAL SWITCH SYSTEM USING OPTICAL INTERFERENCE

(75) Inventors: Tetsuya Kawanishi, Tokyo (JP); Masayuki Izutsu, Tokyo (JP); Takahide Sakamoto, Tokyo (JP); Masahiro Tsuchiya, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 958 days.

(21) Appl. No.: 12/095,542

(22) PCT Filed: Nov. 29, 2006

(86) PCT No.: PCT/JP2006/323772
§ 371 (c)(1),
(2), (4) Date: Jun. 19, 2008

(87) PCT Pub. No.: WO2007/063871
PCT Pub. Date: Jun. 7, 2007

(65) Prior Publication Data
US 2010/0150495 A1    Jun. 17, 2010

(30) Foreign Application Priority Data
Dec. 1, 2005   (JP) ................................. 2005-347679

(51) Int. Cl.
*G02F 1/035* (2006.01)
*G02F 1/01* (2006.01)
*G02F 1/295* (2006.01)
*G02B 26/00* (2006.01)
*G02B 6/26* (2006.01)
*G02B 6/42* (2006.01)

(52) U.S. Cl. ......... 385/3; 385/8; 385/9; 385/15; 385/16; 359/238; 359/279

(58) Field of Classification Search ...... 385/3; 359/238, 359/279
See application file for complete search history.

(56) References Cited

U.S. PATENT DOCUMENTS
4,860,279 A * 8/1989 Falk et al. ............... 398/43
(Continued)

FOREIGN PATENT DOCUMENTS
JP    6313017    * 1/1988
(Continued)

OTHER PUBLICATIONS
Kawanishi et al., "High-speed optical FSK modulator for optical packet labeling," in Optical Fiber Communication Conferece, Technical Digest (CD) (Optical Society of America, 2004), paper PD 16.*
(Continued)

*Primary Examiner* — Ryan Lepisto
*Assistant Examiner* — Erin Chiem
(74) *Attorney, Agent, or Firm* — Myers Wolin, LLC

(57) ABSTRACT

It is an object of the present invention to provide an optical switch system using optical interference. An optical switch system (1) comprises an input part (2) of an optical signal, a branching part (3) of the signal, a main Mach-Zehnder waveguide ($MZ_C$) (7), a first intensity modulator (9) provided on a first arm (4) for controlling an amplitude of an optical signal propagating through the first arm (4), a second intensity modulator (10) provided on a second arm (5) for controlling an amplitude of an optical signal propagating through the second arm (5), and a combining part (6) of the signals outputted from the first arm and the second arm, wherein one or both of the branching part (3) and the combining part (6) are X-branched.

13 Claims, 9 Drawing Sheets

U.S. PATENT DOCUMENTS

| | | | | |
|---|---|---|---|---|
| 5,679,291 | A | * | 10/1997 | Hakogi .................. 264/1.24 |
| 6,141,141 | A | | 10/2000 | Wood |
| 6,219,469 | B1 | | 4/2001 | Minakata et al. |
| 2001/0008569 | A1 | | 7/2001 | Rangary |
| 2002/0048076 | A1 | | 4/2002 | Kondo et al. |
| 2002/0126932 | A1 | | 9/2002 | Minakata et al. |
| 2002/0154378 | A1 | | 10/2002 | Kawanishi et al. |
| 2005/0175357 | A1 | | 8/2005 | Kawanishi et al. |
| 2005/0220385 | A1 | | 10/2005 | Kawanishi et al. |

FOREIGN PATENT DOCUMENTS

| | | | |
|---|---|---|---|
| JP | 10-133159 | | 5/1998 |
| JP | 10-213830 | | 8/1998 |
| JP | 11-295674 | | 10/1999 |
| JP | 2000-267056 | | 9/2000 |
| JP | 2002-40381 | | 2/2002 |
| JP | 2002-169133 | | 6/2002 |
| JP | 2002-268025 | | 9/2002 |
| JP | 2003-121806 | | 4/2003 |
| JP | 2005215196 | A * | 8/2005 |
| JP | 2005-274806 | | 10/2005 |
| WO | 2004-083953 | | 9/2004 |

OTHER PUBLICATIONS

Kawanishi et al., "Ultra-wide-band signal generation using high-speed optical frequency-shift-keying technique," in Microwave Photonics, 2004. MWP'04. 2004 IEEE International Topical Meeting on, vol., no., pp. 48-51, Oct. 4-6, 2004.*

European Search Report issued on Dec. 20, 2010 for corresponding European Patent Application No. 06833576.9-2205.

Kawanishi, T., et al. "40Gbit/s Versatile LiNbO3 Lightwave Modulator," European Conference on Optical Communication, Sep. 25-29, 2005 Proceedings—vol. 4, Paper Th 2.2.6., p. 855.

Kawanishi, T., et al. "High Extinction Ratio Optical Modulator Using Active Intensity Trimmers," European Conference on Optical Communication Sep. 25-29, 2005 Proceedings—vol. 4, Paper Th 1.6.6, p. 841.

Translation of International Preliminary Report on Patentability and Written Opinion of PCT/JP2006/323772, issued Jun. 3, 2008.

Tetsuya Kawanishi and Masayuki Izutsu, "Optical FSK modulator using an integrated lightwave circuit consisting of four optical phase modulators" CPT-Archives, CPT Digest vol. 07, G-3, pp. 139-140 (2004).

T. Kawanishi, S. Oikawa, M. Izutsu, "Resonant-type Optical Modulator with Planar Structures" Technical Report of IEICE, LQE2001-3, pp. 13-16. May 2001.

Hiroshi Nishihara, Haruna Masamitsu, Toshiaki Suhara, "Optical integrated circuit" (revised and updated edition), Ohmsha, pp. 119-120. Sep. 7, 2005. English Abstract.

T. Kawanishi et al., "High Extinction Ratio Optical Modulator Using Active Intensity Trimmers", European Conference on Optical Communication ECOC 2005 Proceedings vol. 4, pp. 841-842. Sep. 25, 2005.

Tetsuya Kawanishi, Naoya Wada, Takahide Sakamoto, Masahiro Tsuchiya, Masayuki Izutsu, "Ultra High Extinction Ratio Intensity Modulation Using Optical FSK Modulator", IEICE Technical Report, vol. 105, No. 243 (OCS2005 35-45), pp. 41-44. Aug. 19, 2005. English Abstract.

Tetsuya Kawanishi, Tahahide Sakamoto, Masahiro Tsuchiya, Masayuki Izutsu "Generation of double sideband radio-on-fiber signal with large carrier suppression ratio". National Institute of Information and Communications Technology, Sep. 7, 2005. With English Translation.

* cited by examiner

Fig. 1
Fig. 1A
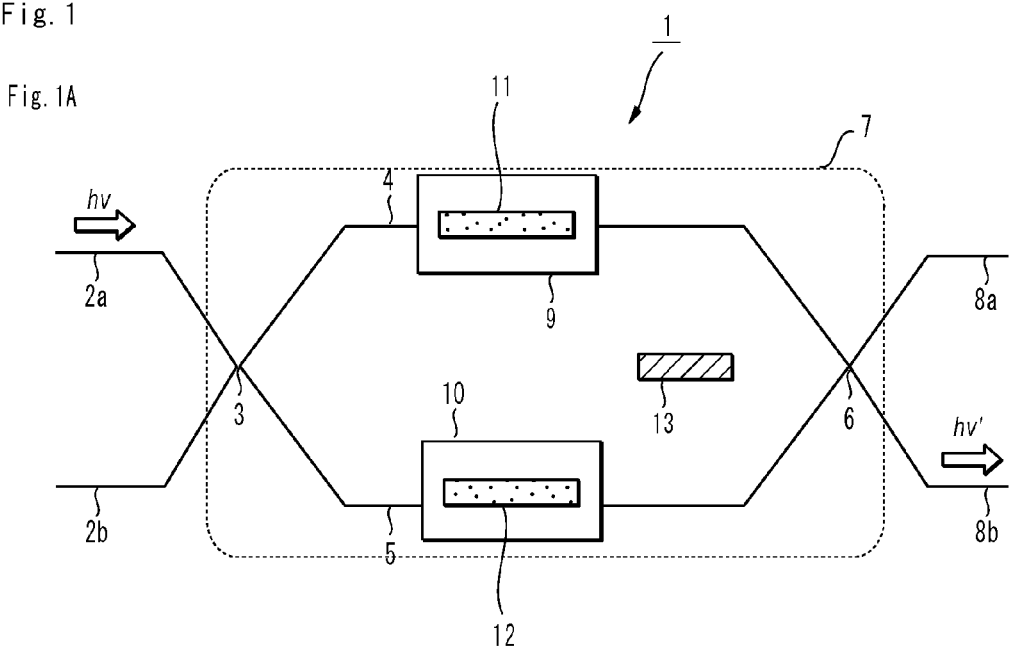
Fig. 1B
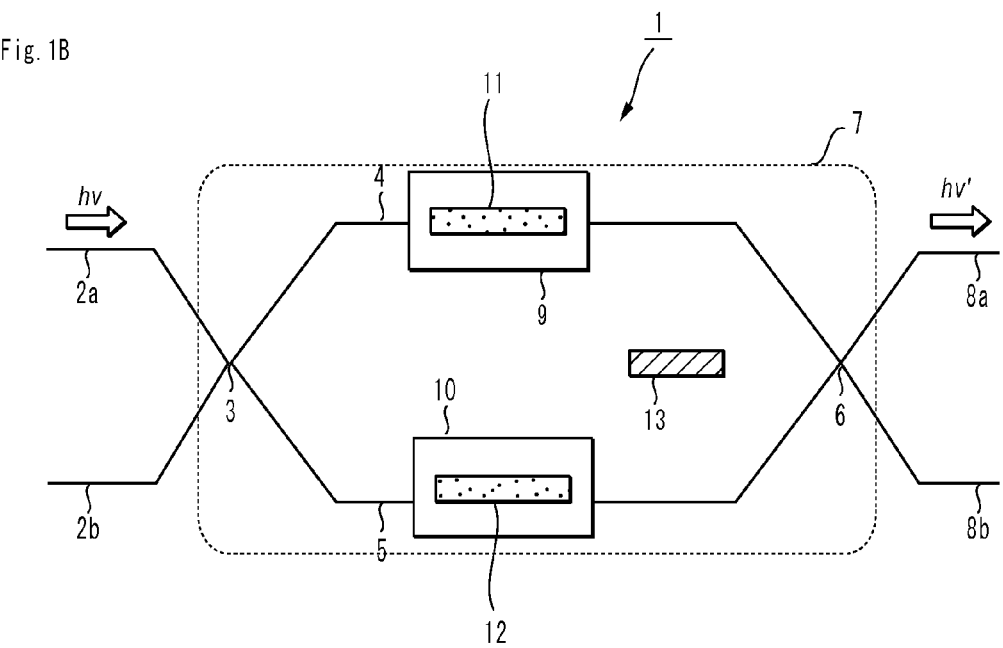

Fig. 2
Fig. 2A
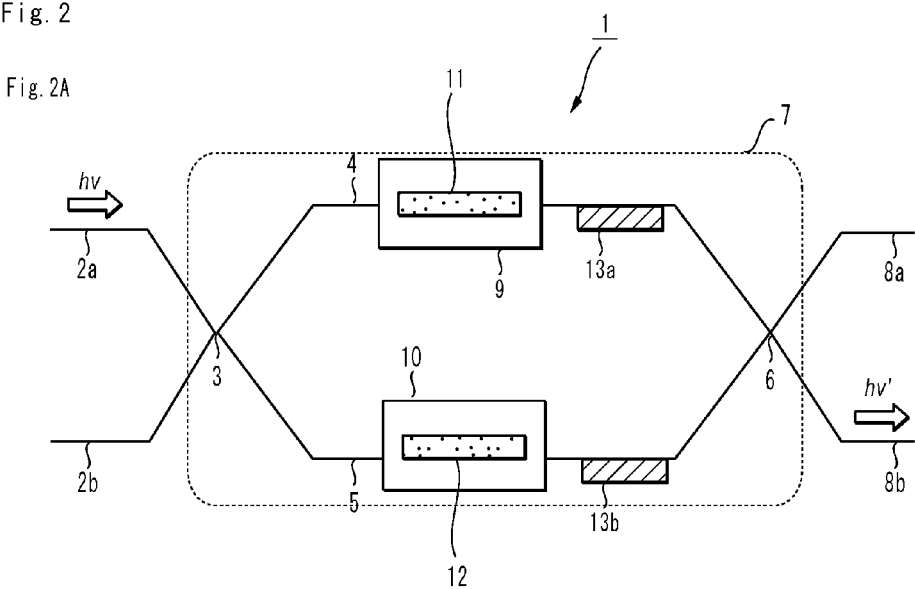
Fig. 2B
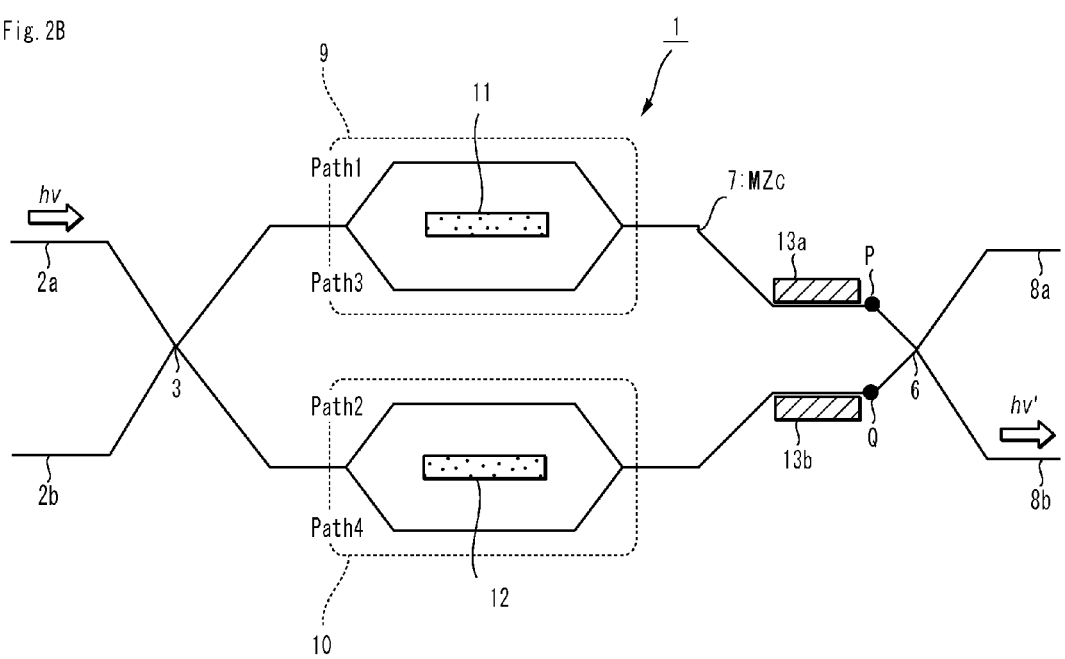

Fig. 4
Fig. 4A
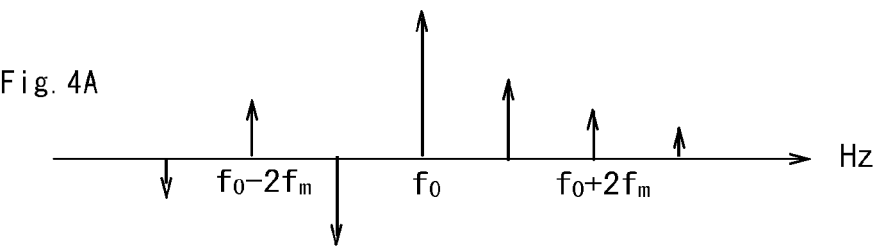
Fig. 4B
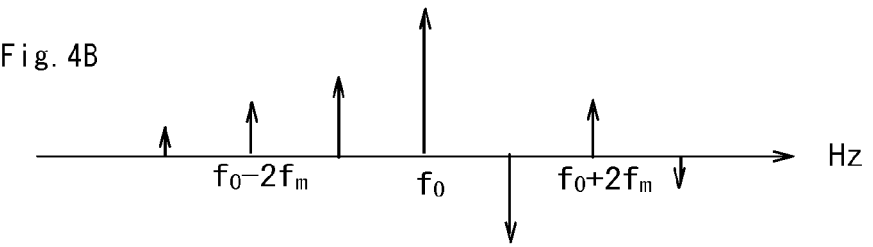
Fig. 4C
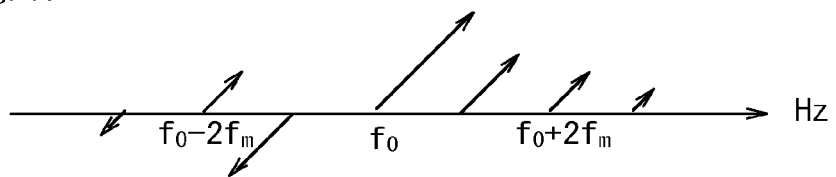
Fig. 4D
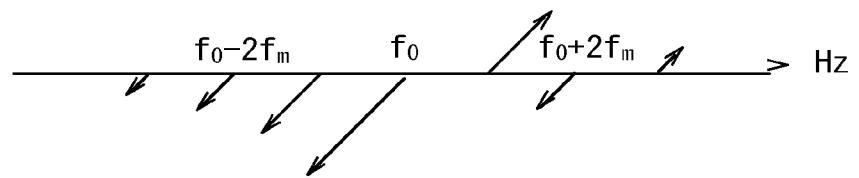
Fig. 4E
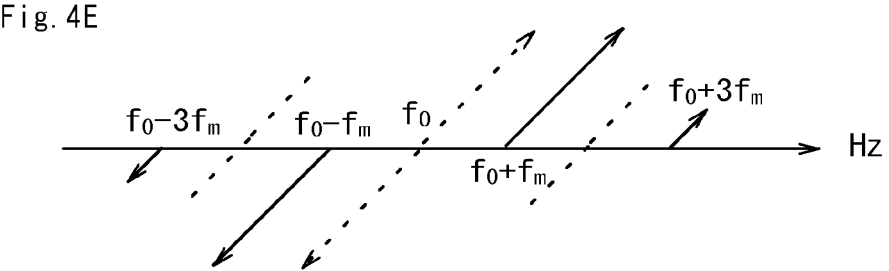
Fig. 4F
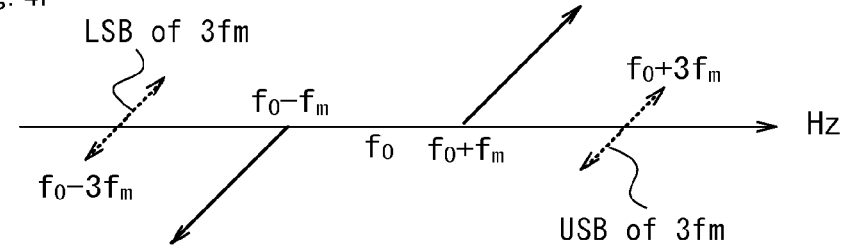

OPTICAL SWITCH SYSTEM USING OPTICAL INTERFERENCE

CROSS REFERENCE TO RELATED APPLICATIONS

The present disclosure is a national phase filing under 35 U.S.C. §371 of International Patent Application No. PCT/JP2006/323772 filed on Nov. 29, 2006, which claims priority to Japanese Patent Application No. 2005-347679 filed on Dec. 1, 2005, the disclosures of which are expressly incorporated herein by reference in its entireties.

BACKGROUND OF THE INVENTION

1. Field of the Invention

The present invention relates to an optical switch system using optical interference. In particular, the present invention provides an optical switch system having intensity modulators on both arms of a main Mach-Zehnder waveguide, and the present invention further provides a plural of waveguides by forming X-branched waveguide route structures on one or both of an input part and an output part of the main Mach-Zehnder waveguide, thereby switching an output of the main Mach-Zehnder waveguide.

2. Description of The Related Art

In optical information communication, an optical signal entering into a network from the other network is routed by a node which transmits the signal into the network (referred to as an edge node below). In general, the edge node, having received an optical information signal, converts it into an electric signal, then converts the electric signal into optical information signals again, and transmits the optical information signals to each network. Even if a high-speed transmission of an optical signal is realized, if the above routing process takes time, transmission speed of the information communication is restricted. Therefore, a routing technique of an optical signal is required.

As an optical switch with the above routing technique, a Mach-Zehnder interferometer having a pair of 2×2 directional coupler is proposed. By applying electric signals to a waveguide portion composing the interferometer externally, refractive index of the waveguide can be changed rapidly. However, there is a problem that the optical switch can not always perform routing operations properly.

On the other hand, an optical modulator having a Mach-Zehnder waveguide is used in the field of the optical information communication. The inventors developed an optical SSB modulator having Mach-Zehnder modulators and an optical FSK modulator with Mach-Zehnder modulators (see for example Tetsuya Kawanishi and Masayuki Izutsu, "Optical FSK modulator using an integrated light wave circuit consisting of four optical phase modulator", CPT 2004 G-2, Tokyo, Japan, 14-16 Jan. 2004).

The object of the present invention is to provide an optical switch system using optical interference. Another object of the invention is to provide a router for optical information communication capable of routing an optical signal as it is.

SUMMARY OF THE INVENTION

The present invention is basically based on following idea. By controlling modulation signals of intensity modulators (in particular, ones having sub Mach-Zehnder waveguides) provided on both arms of a main Mach-Zehnder waveguide, phases of optical signals propagating through each arms of the main Mach-Zehnder waveguide are controlled. And by adjusting optical signals combined at a combining part of the main Mach-Zehnder waveguide, the waveguide from which optical signals are outputted can be switched effectively.

In particular, the optical switch system of the present invention comprises: one or a plurality of input parts (2a, 2b) of an optical signal; a main Mach-Zehnder waveguide ($MZ_C$) (7) comprising a branching part (3) for branching the optical signal, a first arm (4) being a waveguide, wherein an optical signal branched by the branching part (3) propagates, a second arm (5) being a waveguide, wherein the other optical signal branched by the branching part (3) propagates, and a combining part (6) for combining the optical signals outputted from the first arm (4) and the second arm (5); one or a plurality of output parts (8a, 8b) for outputting the optical signal combined by the combining part; a first intensity modulator (9) being provided on the first arm (4) and the first intensity modulator controlling an amplitude of the optical signal propagating through the first arm; a second intensity modulator (10) being provided on the second arm (5) and the second intensity modulator controlling an amplitude of the optical signal propagating through the second arm; a first electrode (electrode A) (11) of the first intensity modulator (9); a second electrode (electrode B) (12) of the second intensity modulator (10); a third electrode (electrode C) (13) of the main Mach-Zehnder waveguide ($MZ_C$) (7), wherein a modulation signal is applied to the third electrode, and the modulation signal controls a phase difference between optical signals which respectively propagates through the first arm and the second arm; and a signal source part (16) comprising a first signal source (14) and a second signal source (15), wherein the first signal source (14) applies bias voltage to the first electrode (electrode A) (11), the second electrode (electrode B) (12), and the third electrode (electrode C) (13), the second signal source (15) applies a high-speed electric signal to the third electrode (electrode C) (13). And one or both of the branching part (3) and the combining part (6) of the optical switch system are X-branched.

One or both of the branching part (3) and the combining part (6) are X-branched. By controlling bias voltage applied to the first intensity modulator (9) or the second intensity modulator (10), the output part (8a, 8b) of an optical signal can be switched. By switching a baseband signal applied to the third electrode, the output part (8a, 8b) of an optical signal can also be switched.

The optical switch system of the present invention comprises intensity modulators having Mach-Zehnder waveguides on both arms of the main Mach-Zehnder waveguide so that high extinction ratio can be realized. Thus, an optical switch can be performed effectively by this system.

This invention can provide an optical switch system using optical interference. This invention can also provide a router for optical information communication capable of routing an optical signal as it is.

BRIEF DESCRIPTION OF THE DRAWINGS

FIG. 1 is a schematic diagram showing a basic arrangement of an optical switch system of the present invention. FIG. 1(a) is a diagram explaining that, when an optical signal is inputted to an input part (2a), the optical signal is outputted from the output part (8a), and when an optical signal is inputted to an input part (2b), the optical signal is outputted from the output part (8b). FIG. 1(b) is a diagram explaining that, when an optical signal is inputted to an input part (2a), the optical signal is outputted from the output part (8b), and when an optical signal is inputted to an input part (2b), the optical signal is outputted from the output part (8a).

FIG. 2 is a schematic diagram showing an optical switch system having two-electrode type electrode as the third electrode. FIG. 2(a) shows an example that a general intensity modulator is used in the system. FIG. 2(b) shows an example that an intensity modulator having a Mach-Zehnder waveguide is used in the system.

FIG. 4 is a conceptual diagram illustrating intensity and phase of optical signals of a DSB-SC modulation system. FIG. 4 (a) is a conceptual diagram showing an optical signal spectrum on the first arm. FIG. 4 (b) is a conceptual diagram showing an optical signal spectrum on the second arm. FIG. 4 (c) is a conceptual diagram showing an optical signal spectrum on the first arm which is provided with a phase shift of +90 degrees. FIG. 4 (d) is a conceptual diagram showing an optical signal spectrum on the second arm which is provided with a phase shift of −90 degrees. FIG. 4 (e) is a conceptual diagram showing a spectrum of an output signal generated by interference of optical signals from the first arm and the second arm at the combining part. FIG. 4 (f) is a conceptual diagram showing suppression of a third order signal component by applying a $3f_m$ signal.

DESCRIPTION OF THE PREFERRED EMBODIMENTS

Figure 3:
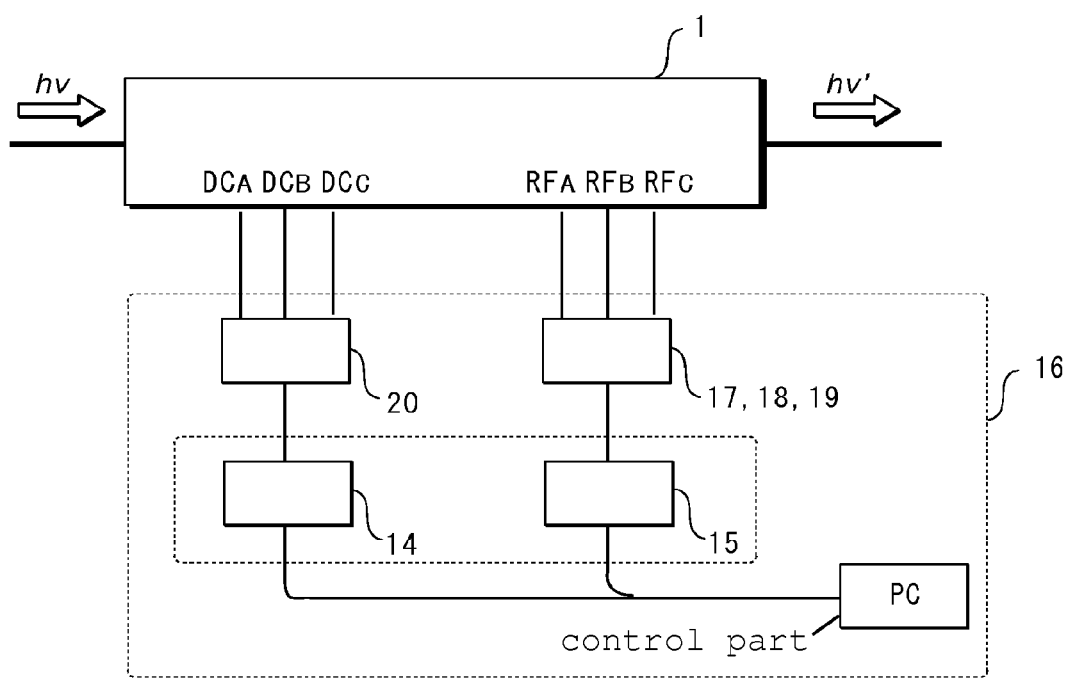
FIG. 3 is a block diagram showing a signal source part of an optical modulation system according to a preferable aspect of the present invention.

A basic arrangement of an optical switch system of the present invention is shown in FIG. 1. FIG. 1(a) is a diagram explaining that, when an optical signal is inputted to an input part (2a), the optical signal is outputted from the output part (8a), and when an optical signal is inputted to an input part (2b), the optical signal is outputted from the output part (8b). FIG. 1(b) is a diagram explaining that, when an optical signal is inputted to an input part (2a), the optical signal is outputted from the output part (8b), and when an optical signal is inputted to an input part (2b), the optical signal is outputted from the output part (8a).

As shown in FIG. 1, the optical switch system (1) of the present invention basically comprises: one or a plurality of input parts (2a, 2b) of an optical signal; a main Mach-Zehnder waveguide ($MZ_C$) (7) comprising a branching part (3) for branching the optical signal, a first arm (4) being a waveguide, wherein an optical signal branched by the branching part (3) propagates, a second arm (5) being a waveguide, wherein the other optical signal branched by the branching part (3) propagates, and a combining part (6) for combining the optical signals outputted from the first arm (4) and the second arm (5); one or a plurality of output parts (8a, 8b) for outputting the optical signal combined by the combining part; a first intensity modulator (9) being provided on the first arm (4) and the first intensity modulator controlling an amplitude of the optical signal propagating through the first arm; a second intensity modulator (10) being provided on the second arm (5) and the second intensity modulator controlling an amplitude of the optical signal propagating through the second arm; a first electrode (electrode A) (11) of the first intensity modulator (9); a second electrode (electrode B) (12) of the second intensity modulator (10); a third electrode (electrode C) (13) of the main Mach-Zehnder waveguide ($MZ_C$) (7), wherein a modulation signal is applied to the third electrode, and the modulation signal controls a phase difference between optical signals which respectively propagates through the first arm and the second arm; and a signal source part (16) comprising a first signal source (14) and a second signal source (15), wherein the first signal source (14) applies bias voltage to the first electrode (electrode A) (11), the second electrode (electrode B) (12), and the third electrode (electrode C) (13), the second signal source (15) applies a high-speed electric signal to the third electrode (electrode C) (13). And one or both of the branching part (3) and the combining part (6) of the optical switch system are X-branched.

One or both of the branching part (3) and the combining part (6) are X-branched. And by controlling bias voltage applied to the first intensity modulator (9) or the second intensity modulator (10), the output part (8a, 8b) of an optical signal can be switched. By controlling a baseband signal applied to the third electrode, the output part (8a, 8b) of an optical signal can also be switched.

As have been technically established by an SSK modulator, an FSK modulator and the like, by controlling bias voltage applied to the first intensity modulator (9) or the second intensity modulator (10), and by switching a baseband signal applied to the third electrode, a frequency of an optical signal outputted is changed, and a USB signal and an LSB signal can be switched over and outputted.

The optical switch system of the present invention is basically based on the following idea. A voltage signal applied to each electrode is adjusted by means of a modulator which is an application of the above described conventional optical modulator (e.g., an SSK modulator, an FSK modulator), thereby switching the output parts (8a, 8b) of an optical signal.

In case the optical switch system of the present invention acts as a 2×2 electro optical switch having two inputs and two outputs, if optical signals propagating through the first arm (4) and the second arm (5) respectively are controlled so that a phase difference between the signals become 180 degrees, an output part can be switched, for example, form the input part (8a) to the input part (8b). The length of waveguides on the first arm (4) and the second arm (5) may be the same or different. In case the lengths of the waveguides of the first arm (4) and the second arm (5) are the same, the system acts as, for example, a conventional optical modulator. On the other hand, if the lengths of the waveguides of the first arm (4) and the second arm (5) are different, the system acts as, for example, an optical filter. Therefore, it can be preferably used in an MSK modulation system and the like.

The optical switch system of the present invention can perform a switching operation rapidly. For example, by switching baseband signals applied to the third electrode, a switching from an input-output relationship shown in FIG. 1(a) (from 2a to 8a or from 2b to 8b) to an input-output relationship shown in FIG. 1(b) (from 2a to 8b or from 2b to 8a), or vice versa (from an input-output relationship shown in FIG. 1(b) to an input-output relationship shown in FIG. 1(a)) can be realized rapidly. The switching operation is performed in the same way as those of the conventional SSK modulation and FSK modulation.

FIG. 1, shows an optical switch system acting as a 2×2 electro optical switch. If the input part of the system is made to be one input structure, for example, by forming a Y-branched input part, a 1×2 electro optical switch can be obtained. In this case, switching operation can be performed by switching output parts. On the other hand, If the output part of the system is made to be one output structure, for example, by forming a Y-branched output part, a 2 times 1 electro optical switch can be obtained. In this case, switching operation can be performed by switching between modes of outputting optical signals and not outputting the optical signals.

A preferred embodiment of the optical switch system of the present invention is an optical switch system comprising the first intensity modulator (9) and the second intensity modulator (10) wherein either one or both of the first intensity modulator (9) and the second intensity modulator (10) have a Mach-Zehnder waveguide.

Either one or both of the branching part (3) and the combining part (6) may be Y-branched or X-branched. A publicly known directional coupler may be provided at either one or both of the branching part (3) and the combining part (6). Symmetric X-branching is preferable, but asymmetric X-branching can also be adopted. Observing stray light, light leaking out from substrate, makes a Y-branched waveguide have the same function as an X-branched waveguide. Therefore, if the stray light is observed, one of the X-branching paths may be on a substrate, and the other branching path may be out of the substrate.

A Mach-Zehnder waveguide or an electrode is generally provided on a substrate. The material of the substrate and each waveguide is not specifically limited if light can propagate therethrough. For example, a lithium niobate waveguide with a Ti diffusion may be formed on an LN substrate, and a silicon dioxide ($SiO_2$) waveguide may be formed on a silicon (Si) substrate. Also, an optical semiconductor waveguide such as an InGaAsP waveguide (a GaAlAs waveguide) formed on an indium phosphide substrate (a GaAs substrate) may be used. The substrate is preferably formed of lithium niobate ($LiNbO_3$: LN) and cut out in a direction orthogonal to the X-axis (X-cut), and light is propagated in a Z-axis direction (Z-axis propagation). This is because a low-power-consumption drive and a superior response speed can be achieved due to dynamic electrooptic effect. An optical waveguide is formed in the surface portion of a substrate having an X-cut plane (YZ plane), and guided light propagates along the Z-axis (the optic axis). A lithium niobate substrate except the X-cut may be used. As a substrate, it is possible to use a material of a one-axis crystal having a crystal system such as a trigonal system and a hexagonal system and having electro optical effect or a material in which a point group of a crystal is $C_{3V}$, $C_3$, $D_3$, $C_{3h}$, and $D_{3h}$. These materials have a refractive index adjusting function in which a change in the refractive index due to the application of an electric field has a different sign depending on a mode of propagation light. As a specific example, lithium tantalite oxide ($LiTO_3$: LT), $\beta$-$BaB_2O_4$ (abbr. BBO), $LiIO_3$ and the like can be used other than lithium niobate.

The dimension of the substrate is not specifically limited if it is large enough to be able to form a predefined waveguide. The width, length, and the depth of each waveguide is also not specifically limited if the module of the present invention can fulfill its function. The width of each waveguide can be, for example, around 1 μm to 20 μm, preferably about 5 μm to 10 μm. The depth (the thickness) of waveguide can be 10 nm to 1 μm, preferably 50 nm to 200 nm.

The first bias adjustment electrode (electrode A) controls a phase of light propagating through the two arms of the $MZ_A$ by controlling bias voltage between the two arms (path 1 and Path 3) composing the $MZ_A$. On the other hand, the second bias adjustment electrode (electrode B) controls a phase of light propagating through the two arms of the $MZ_B$ by controlling bias voltage between the two arms (path 2 and Path 4) composing the $MZ_B$. The electrode A and the electrode B are preferably direct current electrodes or low frequency electrodes in general. It is to be noted that "low frequency" of the low frequency electrode means frequency of, for example, 0 Hz to 500 MHz. A phase modulator for adjusting a phase of an electric signal is preferably provided at an output of the signal source of this low frequency signal in order to be able to control a phase of an output signal.

The third electrode may be a conventional one-electrode type electrode, or may be a two-electrode type electrode mentioned below. The third electrode having a two-electrode type electrode comprises either one or both of: an electrode ($MZ_{CA}$ electrode) (13a) being provided along a waveguide portion, the waveguide portion being between a combining part of the first sub Mach-Zehnder waveguide ($MZ_A$) (9) and the combining part (6) of the main Mach-Zehnder waveguide ($MZ_C$) (7); and an electrode ($MZ_{CB}$ electrode) (13b) being provided along a waveguide portion, the waveguide portion being between a combining part of the second sub Mach-Zehnder waveguide ($MZ_B$) (10) and the combining part (6) of the main Mach-Zehnder waveguide ($MZ_C$) (7).

The first main Mach-Zehnder electrode ($MZ_{CA}$ electrode) (13a) is one being laid along at least a part of the waveguide between an output part of the first sub Mach-Zehnder waveguide ($MZ_A$) and the combining part. And, "at least a part" is a length long enough to be able to adjust phase of an output signal.

The second main Mach-Zehnder electrode ($MZ_{CB}$ electrode) (13b) is one being laid along at least a part of the waveguide between an output part of the second sub Mach-Zehnder waveguide ($MZ_B$) and the combining part, which is the same as the $MZ_{CA}$ electrode (11). It is to be noted that the first main Mach-Zehnder electrode ($MZ_{CA}$ electrode) and the second main Mach-Zehnder electrode ($MZ_{CB}$ electrode) may be one that make the waveguide portion whereon each of the electrodes is provided act as an optical phase modulator.

The $MZ_{CA}$ electrode and the $MZ_{CB}$ electrode are preferably connected to a high-speed electric signal source (the second signal source). The high-speed electric signal source is a device for controlling a signal transmitting through waveguides which are respectively adjacent to the $MZ_{CA}$ electrode and the $MZ_{CB}$ electrode. As the high-speed electric signal source, a known high-speed electric signal source (a signal source which can output a signal having a predetermined frequency) can be adopted. Frequency ($f_m$) of the high-speed electric signal inputted to the $MZ_{CA}$ electrode and the $MZ_{CB}$ electrode, for example, is from 0 Hz (direct current component) to 100 GHz. It may also be from 10 MHz to 1 GHz, from 10 Hz to 100 MHz, and 100 MHz to 100 GHz. Since switching operation is performed in the present invention, the high-speed electric signal applied when the switching operation is performed preferably has a nearly direct current component from 0 Hz (direct current component) to about 100 GHz. A sinusoidal wave having a fixed frequency is, for example, an output of a high-speed electric signal source. A phase modulator is preferably provided at an output of this high-speed electric signal source in order to be able to control a phase of an output signal.

The $MZ_{CA}$ electrode and the $MZ_{CB}$ electrode are composed of e.g., gold, platinum or the like. The width of the $MZ_{CA}$ electrode and the $MZ_{CB}$ electrode is, for example, 1 μm to 10 μm, and are specifically 5 μm. The length of the $MZ_{CA}$ electrode and the $MZ_{CB}$ electrode is, for example, 0.1 times to 0.9 times the wavelength ($f_m$) of the modulation signal, including 0.18 to 0.22 times or 0.67 to 0.70 times, and more preferably, it is shorter than the resonant point of the modulation signal by 20 to 25%. This is because with such length, the synthesized impedance with a stub electrode remains in an appropriate region. A more specific length of the $MZ_{CA}$ electrode and the $MZ_{CB}$ electrode is, for example, 3250 µm. Hereinafter, a resonant-type electrode and a traveling-wave-type electrode are described.

A resonant-type optical electrode (resonant-type optical modulator) is an electrode for performing modulation by resonance of a modulation signal. A known resonant-type electrode such as those described in the Japanese Patent Application Laid-Open 2002-268025, and [Tetsuya Kawanishi, Satoshi Oikawa, Masayuki Izutsu, "Planar Structure Resonant-type Optical Modulator", TECHNICAL REPORT OF IEICE, LQE2001-3 (2001-05)] can be adopted as a resonant-type electrode.

A traveling-wave-type electrode (traveling-wave-type optical modulator) is an electrode (modulator) for modulating light while guiding waves so that a lightwave and an electric signal are guided in the same direction (e.g., Hiroshi Nishihara, Masamitsu Haruna, Toshiaki Suhara, "Optical Integrated Circuit" (revised and updated edition), Ohmsha, pp. 119-120). A known traveling-wave-type electrode such as those described in Japan Patent Application Laid-Open Nos. 11-295674, 2002-169133, 2002-40381, 2000-267056, 2000-471159, and 10-133159, for example, can be adopted as a traveling-wave-type electrode.

As a preferred traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes on both sides of the signal electrode, a high frequency wave outputted from the signal electrode is made easy to be applied to the earth electrodes arranged on the left and right side of the signal electrode, thereby suppressing an emission of a high frequency wave to the side of the substrate.

The $MZ_{CA}$ electrode and the $MZ_{CB}$ electrode may act as both of the electrodes for the RF signal and the DC signal. Namely, either one or both of the $MZ_{CA}$ electrode and the $MZ_{CB}$ electrode are connected to a feeder circuit (bias circuit) for supplying the DC signal and the RF signal mixed.

The branching part (5) of the main Mach-Zehnder waveguide ($MZ_C$) is a part where optical signals branch into the first sub Mach-Zehnder waveguide ($MZ_A$) and the second sub MZ waveguide ($MZ_B$), and a Y-branched branching part can be used. The combining part (6) is a part where optical signals outputted from the first sub Mach-Zehnder waveguide ($MZ_A$) and the second sub Mach-Zehnder waveguide ($MZ_B$) are combined, and a Y-branched combining part can be used. The above Y-branched waveguide may be symmetry or asymmetry. As the branching part (5) or the combining part (6), a directional coupler can be used.

It is preferable for the optical modulation system of the present invention to be provided with a control part electrically (or optically) connected to a signal source of each electrode so as to adequately control timing and phase of signals applied to each electrode. The control part adjusts modulation time of a modulation signal applied to the first electrode (electrode A) and the second electrode (electrode B) and a modulation signal applied to the first main Mach-Zehnder electrode ($MZ_{CA}$ electrode) and the second main Mach-Zehnder electrode ($MZ_{CB}$ electrode). In other words, the control part adjusts considering propagation time of light so that modulation by each electrode is performed to a certain signal. This modulation time is adequately adjusted based on, for example, a distance between each electrode.

A control part, for example, adjusts voltage applied to the first main Mach-Zehnder electrode ($MZ_{CA}$ electrode) and the second main Mach-Zehnder electrode ($MZ_{CB}$ electrode) so that phase difference of optical carrier signals or certain high order optical signals contained in output signals from the first sub Mach-Zehnder waveguide ($MZ_A$) and the second sub Mach-Zehnder waveguide ($MZ_B$) becomes 180 degrees. This control part, for example, is a computer which is connected to signal sources of each electrode and stores a processing program. When the computer receives an input of control information from an input device such as a keyboard, a CPU reads out, for example, a processing program stored in a main program, and reads out necessary information from memories based on an order of the processing program, rewrites information stored in memories as needed, and outputs an order, which controls timing and phase difference of optical signals outputted from a signal source, to signal source from an external output device. As the processing program, one that makes a computer have the following two means is adopted. One is a means for grasping phase of a certain component on each sub Mach-Zehnder, and the other is a means for generating an order to adjust a modulation signal applied to the first main Mach-Zehnder electrode ($MZ_{CA}$ electrode) and the second main Mach-Zehnder electrode ($MZ_{CB}$ electrode), so that the phase of a certain component is reversed, by using phase information of a certain information grasped by the means for grasping.

Operation Example of Optical Switch System

Hereinafter, the operation of the optical switch system is described. Bias voltages are applied to the electrode A and the electrode B of the parallel aligned four optical modulators of the sub MZ waveguides so that phase differences of optical signals become 90 degrees respectively. These phase differences of the electric signals and the optical signals are adjusted as needed, but are basically adjusted to be an integral multiple of 90 degrees.

Ideally, an optical signal whose frequency is shifted by the frequency of the each RF signal is outputted from the sub mach-Zehnder. In reality, a carrier wave (carrier signal) or a high order component (e.g., a second order component ($f_0 \pm 2f_m$)) is contained in the optical signal. The optical switch system of the present invention operates to suppress at least one of them.

In other words, the phases of carrier waves (carrier signals) and a high order component (e.g., a second order component ($f_0 \pm 2f_m$)) of optical signals outputted from each sub Mach-Zehnder waveguide are decided by phase or bias voltage of signals applied to each sub Mach-Zehnder waveguide. Therefore, components to be suppressed are effectively suppressed by adjusting phases of output signals from each sub Mach-Zehnder waveguide so that the phases of components to be suppressed (carrier waves (carrier signals) of an optical signal or a high order component (e.g. a second order component ($f_0 \pm 2f_m$)) are reversed before combined at the combining part.

The optical switch system of the present invention can act as a DSB-SC modulator, an FSK modulator, and an SSB modulator by controlling optical signal components canceling each other.

Manufacturing Method of Optical Switching System

The optical switching system of the present invention comprises a substrate, waveguides formed on the substrate, electrodes, a signal source, a measuring part, a control part and the like. As a forming method of an optical waveguide, a publicly know forming method of the internal diffusion method such as the titanium diffusion method or a proton exchange method and the like can be used. In other words, the optical switch system of the present invention, for example, can be manufactured by the following method. Firstly, an optical waveguide is formed by patterning titanium on the surface of a wafer of lithium niobate by photolithography method, and spreading titanium by thermal diffusion method. This is subject to the following conditions. The thickness of titanium is 100 to 2000 angstrom, diffusion temperature is 500 to 2000° C., and diffusion time is 10 to 40 hours. An insulating buffer layer of silicon dioxide (thickness of 0.5 to 2 μm) is formed on a principle surface of the substrate. Secondly, an electrode with metal plating with thickness of 15 to 30 μm is formed on the buffer layer. And lastly, the wafer is cut off. By these processes, an optical switch system formed with titanium-diffused waveguide is manufactured.

The optical switch system, for example, can be manufactured by the following process. A waveguide can be provided on the substrate surface of lithium niobate by proton exchange method or titanium thermal diffusion method. For example, Ti metal stripe (length of few μm) is formed in a row on an LN substrate by photolithographic technique. Subsequently, Ti metal is diffused into the substrate by exposing the LN substrate to heat (about 1000° C.). Through this process, a waveguide can be formed on an LN substrate.

Also, an electrode is manufactured in the same way as the above process. For example, in the same way as a formation of an optical waveguide, by using photolithography technique, an electrode can be formed on both sides of a plurality of waveguides formed in the same breadth. And, the electrode can be formed so that the inter-electrode gap is about 1 μm to 50 μm In case of manufacturing an electrode using silicon substrate, the manufacturing process, for example, is as follows. A lower cladding layer is disposed on a silicon (Si) substrate by the flame hydrolysis deposition method. The lower cladding layer is composed mostly of silicon dioxide ($SiO_2$). And then a core layer is deposed. The core layer is composed mostly of silicon dioxide ($SiO_2$) to which germanium dioxide ($GeO_2$) is added as a dopant. Subsequently, vitrification is performed in an electric furnace. And then, an optical waveguide portion is formed by etching. And an upper cladding layer is disposed. The upper cladding layer is composed mostly of silicon dioxide ($SiO_2$). And then, a thin-film heater thermooptic intensity modulator and a thin-film heater thermooptic phase modulator are formed on the upper cladding layer.

In general, high extinction ratio cannot be obtained by an optical modulator having a conventional Mach-Zehnder waveguide. So even if an optical path of the waveguide is switched, the optical path cannot be switched completely, and optical signals are outputted, to a certain extent, to a previous path. However, by using optical modulator achieving high extinction ratio, optical path can be switched effectively. Therefore, an optical switch system using an optical modulator or optical modulation system realizing a high extinction ratio as an optical modulator using a Mach-Zehnder waveguide is a preferred embodiment of the present invention.

Optical Switch System Having Two-Electrode Type Third Electrode

FIG. 2 is a schematic diagram showing an optical switch system having two-electrode type electrode as the third electrode. FIG. 2(a) shows an example that a general intensity modulator is used in the system. FIG. 2(b) shows an example that an intensity modulator having a Mach-Zehnder waveguide is used in the system. As shown in FIG. 2, a preferred embodiment of the optical switch system of the present invention is one of the above described optical switch systems wherein the third electrode (electrode C) (13) comprises either one or both of an electrode ($MZ_{CA}$ electrode) (13a) which is provided along a waveguide portion between a combining part of the first sub Mach-Zehnder waveguide ($MZ_A$) (9) and the combining part (6) of the main Mach-Zehnder waveguide ($MZ_C$) (7); and an electrode ($MZ_{CB}$ electrode) (13b) which is provided along a waveguide portion between a combining part of the second sub Mach-Zehnder waveguide ($MZ_B$) (10) and the combining part (6) of the main Mach-Zehnder waveguide ($MZ_C$) (7).

In particular, the optical switch system of this embodiment comprises: one or a plurality of input parts (2a, 2b) of an optical signal; a main Mach-Zehnder waveguide ($MZ_C$) (7) comprising: a branching part (3) for branching the optical signal, a first arm (4) being a waveguide, wherein an optical signal branched by the branching part (3) propagates, a second arm (5) being a waveguide, wherein the other optical signal branched by the branching part (3) propagates, and a combining part (6) for combining the optical signals outputted from the first arm (4) and the second arm (5); one or a plurality of output parts (8a, 8b) for outputting the optical signal combined by the combining part; a first intensity modulator (9) provided on the first arm (4) for controlling an amplitude of the optical signal propagating through the first arm; a second intensity modulator (10) provided on the second arm (5) for controlling an amplitude of the optical signal propagating through the second arm; a first electrode (electrode A) (11) of the first intensity modulator (9); a second electrode (electrode B) (12) of the second intensity modulator (10); a first main Mach-Zehnder electrode ($MZ_{CA}$ electrode) (13a) provided along at least a part of a waveguide portion between an output part of the first intensity modulator (9) and the combining part; and a second main Mach-Zehnder electrode ($MZ_{CB}$ electrode) (13b) provided along at least a part of a waveguide portion between an output part of the second intensity modulator (10) and the combining part.

The optical switch system of the present invention comprises the first main Mach-Zehnder electrode ($MZ_{CA}$ electrode) and the second main Mach-Zehnder electrode ($MZ_{CB}$ electrode). Since these electrodes are able to adjust phases of output signals from the sub Mach-Zehnder waveguides and the like provided on both arms of the Mach-Zehnder, optical phases of the output signals from the each sub Mach-Zehnder waveguides can be controlled. A carrier wave (a carrier signal) or a high order component (e.g. a second order component ($f_0 \pm 2f_m$)) of the optical signals to be combined is controlled so that the phases of the carrier wave or the high order component and the like are reversed, and then, the optical signals are combined, thereby suppressing these components. In order to suppress certain components this way, the following steps are preferably performed. A photodetector detects the output signal. A controlling part receives the optical signal measured by the photodetector, and the controlling part analyses intensity of a certain component to be suppressed which is contained in the optical signal to be detected, then the controlling part outputs an order to decrease intensity of the component to a signal source. Through these steps, voltage and the like which can suppress a certain signal component automatically can be obtained.

Each sub Mach-Zehnder waveguide has, for example, a waveguide of nearly hexagonal shape (which composes two arms of the Mach-Zehnder), and is provided with two parallel-aligned phase modulators. The phase modulators are, for example, realized by electrodes laid along with the waveguides.

As a result, components to be suppressed can be suppressed effectively, thereby performing optical switch operation effectively.

FIG. 3 is a block diagram showing a signal source part of an optical modulation system according to a preferable aspect of the present invention. As shown in FIG. 3, the signal source according to this aspect comprises a signal source part (16) including a first signal source (14) and a second signal source (a high-speed electric signal source) (15). The first signal source (14) applies bias voltage to the first electrode (electrode A), the second electrode (electrode B), and the third electrode (electrode C: $MZ_{CA}$ and $MZ_{CB}$). The second signal source (15) applies a high-speed electric signal to the third electrode (electrode C) (13). And the second signal source (15) comprises a third harmonic signal generator (17), a phase adjusting part (18), and a signal intensity adjusting part (19). The third harmonic signal generator (17) generates an electric signal ($3f_m$) whose frequency is three times the frequency of a basic signal ($f_m$). The phase adjusting part (18) adjusts a phase difference between a phase of the basic signal ($f_m$) and a phase of the electric signal ($3f_m$), wherein the basic signal ($f_m$) is outputted from the second signal source (15), the electric signal ($3f_m$) is outputted from the third harmonic signal generator (17), and the electric signal ($3f_m$) has frequency three times the frequency of the basic signal ($f_m$). A signal intensity adjusting part (19) adjusts intensity of the basic signal ($f_m$) or the electric signal ($3f_m$), wherein the basic signal ($f_m$) is outputted from the second signal source (15), the electric signal ($3f_m$) is generated from the third harmonic signal generator (17), and the electric signal ($3f_m$) has a frequency three times the frequency of the basic signal ($f_m$).

The third harmonic signal generator (17) generates a third harmonic signal ($3f_m$) which has a frequency three times of the frequency of the basic signal ($f_m$). The second signal source (15) generates the basic signal ($f_m$). Then the phase adjusting part (18) adjusts phase difference between the phase of the basic signal ($f_m$) and the phase of the electric signal ($3f_m$). And the signal intensity adjusting part (19) adjusts intensity of the electric signal ($3f_m$). And the first order component ($f_0 \pm 3f_m$), which is generated by applying a signal ($3f_m$), is applied to the third order component ($f_0 \pm 3f_m$), which is generated by applying the basic signal ($f_m$), after the first order component is adjusted so that the first order component and the third order component have reversed phase and the same intensity level. Thus, theses components cancel each other, and an optical modulation with a high extinction ratio can be realized.

The third harmonic signal generator (17) generates a third harmonic signal ($3f_m$) which has a frequency three times of the frequency of the basic signal ($f_m$). The second signal source (15) generates the basic signal ($f_m$). Then the phase adjusting part (18) adjusts phase difference between the phase of the basic signal ($f_m$) and the phase of the electric signal ($3f_m$). And the signal intensity adjusting part (19) adjusts intensity of the electric signal ($3f_m$). And the first order component ($f_0 \pm 3f_m$), which is generated by applying a signal ($3f_m$), is applied to the third order component ($f_0 \pm 3f_m$), which is generated by applying the basic signal ($f_m$), after the first order component is adjusted so that the first order component and the third order component have reversed phase and the same intensity level. Thus, these components cancel each other, and an optical modulation with a high extinction ratio can be realized.

In the optical modulation system of the present invention, the basic signal of frequency ($f_m$) and the third harmonic signal of frequency ($3f_m$) are preferably applied to the electrode C ($MZ_{CA}$ and $MZ_{CB}$).

It is preferable for the optical modulation system of the present invention to be provided with a control part electrically (or optically) connected to a signal source of each electrode so as to adequately control timing and phase of signals applied to each electrode. The control part acts as adjusting modulation time of a signal applied to the $RF_A$ electrode, the $RF_B$ electrode and the $RF_C$ electrode (i.e. the $RF_A$ signal, the $RF_B$ signal and the $RF_C$ signal). Namely, the control part adjusts considering propagation time of light so that each electrode modulates a certain signal. This modulation time is adequately adjusted based on, for example, a distance between each electrode.

The signal source part (16), for example, includes a first signal source (14) and a second signal source (15). The first signal source supplies bias voltage to the first electrode (electrode A) (11), the second electrode (electrode B) (12), and the third electrode (electrode C) (13). The second signal source supplies high-speed electric signal to the third electrode (electrode C) (13). Intensity, delay (phase), apply timing of bias voltage may be adjusted by the adjusting part (20) as needed. The optical signal outputted from the high-speed electric signal source is, for example, branched in two routes by conductive wire, and amplitude or phase of the each signal is adjusted as needed, then the modulation signals are applied to the $MZ_{CA}$ electrode and the $MZ_{CB}$ electrode.

The second signal source (15), for example, comprises a third harmonic signal generator (17), a phase adjusting part (18), and a signal intensity adjusting part (19). The third harmonic signal generator (17) generates an electric signal ($3f_m$) whose frequency is three times the frequency of a basic signal ($f_m$). The phase adjusting part (18) adjusts a phase difference between a phase of the basic signal ($f_m$) and a phase of the electric signal ($3f_m$), wherein the basic signal ($f_m$) is outputted from the second signal source (15), the electric signal ($3f_m$) is outputted from the third harmonic signal generator (17), and the electric signal ($3f_m$) has frequency three times the frequency of the basic signal ($f_m$). A signal intensity adjusting part (19) adjusts intensity of the basic signal ($f_m$) or the electric signal ($3f_m$), wherein the basic signal ($f_m$) is outputted from the second signal source (15), the electric signal ($3f_m$) is generated from the third harmonic signal generator (17), and the electric signal ($3f_m$) has a frequency three times the frequency of the basic signal ($f_m$).

The electric signal ($f_m$) such as a sinusoidal signal outputted from the high-speed electric signal source (15) is branched in two routes by conductive wire and the like. The electric signal is inputted to the third harmonic signal generator (19) through one of the two routes. The electric signal is then turned into an electric signal with frequency $3f_m$, and its amplitude and phase are adjusted. And then the signal is combined with the electric signal $f_m$ above, and inputted to the optical modulator.

A control part (PC), for example, adjusts voltage applied to the electrode C so that phase difference of optical carrier signals or certain high order optical signals contained in output signals from the first sub Mach-Zehnder waveguide ($MZ_A$) and the second sub Mach-Zehnder waveguide ($MZ_B$) become 180 degrees. This control part, for example, is a computer which is connected to signal sources of each electrode and stores a processing program. When the computer receives an input of control information from an input device such as a keyboard, a CPU reads out, for example, a processing program stored in a main program, and reads out necessary information from memories based on an order of the processing program, rewrites information stored in memories as needed, and outputs an order, which controls timing and phase difference of an optical signal outputted from a signal source, to signal source from an external output device. As the processing program, one that makes a computer have the following two means is adopted. One is means for grasping phase of a certain component on each sub Mach-Zehnder waveguide, and the other is means for generating an order to adjust a modulation signal applied to the electrode C so that the phase of a certain component is reversed by using phase information of a certain component grasped by the means for grasping.

Hereinafter, an operation of the optical modulation system is described. The $MZ_C$ electrode controls a phase difference of the optical signal propagating through the first arm (4) and the second arm (5) of the Mach-Zehnder waveguide. When the phase difference of the optical signal propagating through the both arms is supposed to be g(t), and integer is represented by n, and if g(t) is equal to $2n\pi$, then the optical modulation system becomes ON state. On the other hand, if g(t) is equal to $(2n+1)\pi$, the optical modulation system becomes OFF state. In other words, in this OFF state case, the optical signal is converted to high order radiation mode light, and emitted without being propagated to the output part. By adjusting voltage applied to electrodes of the modulation system, ON state and OFF state is switched to output a signal.

In other words, the intensity of the output signal is proportional to $|\cos(g(t))/2|$. This is the reason why the Mach-Zehnder waveguide is referred to as intensity modulator. The intensity in the OFF state is ideally zero. Therefore, the intensity ratio between On state and OFF state is ideally infinite. But, in reality, carrier components, high order components, and the like remain in the output signal. Therefore, the intensity cannot be zero in the OFF state. The extinction ratio, which is an intensity ratio between the ON state and the OFF state, is an important index to evaluate a characteristic of a Mach-Zehnder waveguide.

When a phase difference of optical signals of the both arms caused by bias voltage applied to the electrode C is supposed to be $\phi^B$, the frequency of the modulation signal applied to the electrode C is supposed to be ($f_m$), and g(t) is supposed to be $\sin 2A^{RF} \sin 2\pi f_m t + \phi_B$, optical intensity of the first order component (USB or LSB) ($D_1$) and optical intensity of the second order component ($D_2$) are represented by the following equation.

$$D_1 = \left|\frac{2A^{RF}\sin\phi_B}{1+(1-|A^{RF}|^2)\cos\phi_B}\right|$$

$$D_2 = \left|\frac{|A^{RF}|^2\cos\phi_B}{1+(1-|A^{RF}|^2)\cos\phi_B}\right|$$

Equation 1

As seen from the above equation, if the bias voltage is adjusted so that $\phi_B$ becomes $\pi$, an even order component, such as a second order component which has carrier component, will be 0, and an average intensity will be around $2|A^{RF}|$. The intensity of a third order component does not remain substantially, and the intensity of a first order component (USB and LSB) remains, thereby realizing the DSB-SC modulation.

However, in the real optical modulation system, unsuppressed carrier component and unsuppressed high order component (especially, third order component) remain, whereby the extinction ratio cannot be infinite. Thus, in the optical modulator (1) according to a preferable aspect of the present invention, a third harmonic signal generator (17) generates an electric signal ($3f_m$) having a frequency three times of the frequency of the basic signal ($f_m$). And the phase adjusting part (18) adjusts phase difference between a phase of a basic signal ($f_m$) and that of the electric signal ($3f_m$), wherein the basic signal ($f_m$) is outputted from the second signal source (high-speed electric signal source) (15) and an electric signal ($3f_m$) having a frequency three times of the frequency of the basic signal ($f_m$), is outputted from the third harmonic signal source (17). The signal intensity adjusting part (19) adjusts the electric signal ($3f_m$). And the third order component ($f_0 \pm 3f_m$), which is generated by applying the basic signal ($f_m$), is adjusted so that the first order component, which is generated by applying a signal ($3f_m$), and the third order component have reversed phase and the same intensity level. This adjustment may be performed by manual operation while monitoring the output from the Mach-Zehnder waveguide. It may also be performed by the control part which adjusts the phase and the timing of the output signal from the signal source part as needed, and applies a preferable signal to an electrode (especially, electrode C) while monitoring the output from the Mach-Zehnder waveguide. In this optical modulation system, a modulation signal with frequency ($f_m$) and a modulation signal with frequency ($3f_m$) are both applied to the electrode C.

FIG. 4 is a conceptual diagram illustrating intensity and phase of the optical signals of the DSB-SC modulation system. FIG. 4 (a) is a conceptual diagram showing an optical spectrum on the first arm. FIG. 4 (b) is a conceptual diagram showing an optical spectrum on the second arm. FIG. 4 (c) is a conceptual diagram showing an optical signal spectrum on the first arm which is provided with a phase shift of +90 degrees. FIG. 4 (d) is a conceptual diagram showing an optical signal spectrum on the second arm which is provided with a phase shift of −90 degrees. FIG. 4 (e) is a conceptual diagram showing a spectrum of an output signal generated by interference of optical signals from the first arm and the second arm at the combining part. FIG. 4 (f) is a conceptual diagram showing suppression of a third order signal component by applying a $3f_m$ signal.

These optical signals outputted from the first arm and the second arm interferes with each other at the combining part. As a result, as shown in FIG. 4(e), a carrier component ($f_0$) and a second order component ($f_0 \pm 2f_m$) are suppressed ideally, and USB component ($f_0 + f_m$) and LSB ($f_0 - f_m$) component remain. The odd order components such as third order components remain but the intensity is not as strong as that of a first order component.

However, if a third order component remains, the extinction ratio cannot be improved. Therefore, in a preferred embodiment of the present invention, as shown in FIG. 4(f), a third order component which has frequency ($3f_m$) is also applied to the electrode C so that the third order component, generated from frequency ($f_m$), and the first order component, generated from frequency ($3f_m$), suppresses with each other. This is realized, as shown in FIG. 4(f), by adjusting output of the signal source so that the first order component, generated from frequency ($3f_m$), and the third order component, generated from frequency ($f_m$), have reversed phase and about the same level of intensity. As shown in FIG. 4(f), since the first order component, generated from frequency ($3f_m$), and the third order component, generated from frequency ($f_m$), have reversed phase and about the same level of intensity, the third order component ($f_0 + 3f_m$) is effectively suppressed. Although the high order components such as a fifth order component and a seventh order component remain, intensities of these components are relatively small, and will not be a problem. If the system of the present invention is applied to the high order components, for example, by applying high frequency signal such as the fifth order component and the seventh order component whose phase, intensity (amplitude)

and the like are adjusted, as modulation signals to the electrode C, these components can be effectively suppressed.

In reality, not only odd order components but also a carrier wave (a carrier signal) or even order components (e.g., a second order component ($f_0 \pm 2f_m$)) of an optical signal are contained in signals. The optical modulation system of the present invention operates to suppress at least one of these components.

The phases of a carrier wave (a carrier signal) or a high order component (e.g., a second order component ($f_0 \pm 2f_m$)) of optical signals outputted from each sub Mach-Zehnder waveguide are decided by phase or bias voltage of a signal applied to each sub Mach-Zehnder waveguide. Therefore, components to be suppressed are effectively suppressed by adjusting phases of output signals from each sub Mach-Zehnder waveguide, so that the phases of components to be suppressed (a carrier wave (a carrier signal) of an optical signal or a high order component (e.g., a second order component ($f_0 \pm 2f_m$)) are reversed, before combined at the combining part.

Optical Switch System Having Two Phase Modulators

Figure 5:
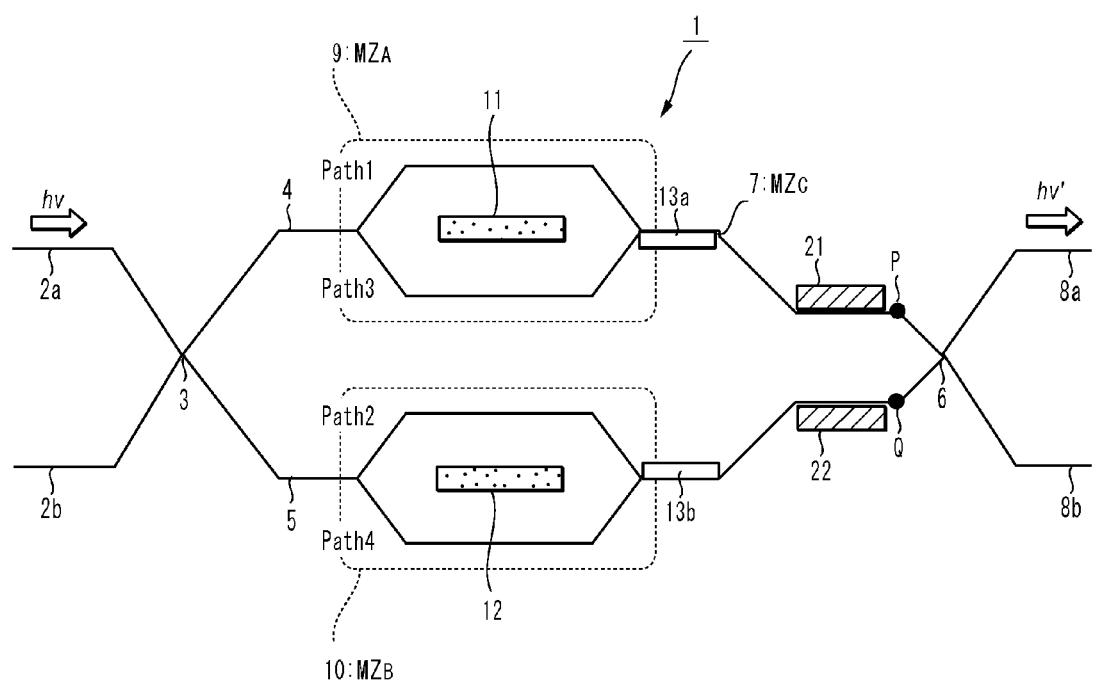
FIG. 5 is a schematic block diagram showing an optical switch system having a pair of phase modulators.

FIG. 5 is a schematic block diagram showing an optical switch system having two phase modulators. Since the optical switch system comprises $MZ_{CA}$ electrode and the $MZ_{CB}$ electrode (in other words, comprises two main Mach-Zehnder electrodes (electrode C)), the optical modulation system can effectively suppress components to be suppressed by adjusting non-desired components (e.g., a carrier, a second order component, a third order component) to have reversed phases, whereby the non-desired components are effectively suppressed. The system further comprises two phase modulators (21, 22) which enable to adjust phases of optical signals propagated to the each modulator. In the figure, an optical switch system having two phase modulators are illustrated, but an optical switch system having one phase modulator can also be adopted.

Hereinafter, an operation of the optical switch system having two phase modulators is described. Bias voltages are applied to the $DC_A$ electrode and the $DC_B$ electrode of the parallel aligned four optical modulators of the sub MZ waveguides so that the phase difference of the optical signals become 90 degrees respectively. These phase differences of the electric signals and the optical signals are adjusted as needed, but are basically adjusted to be an integral multiple of 90 degrees.

Ideally, an optical signal whose frequency is shifted by frequency amount of each RF signal is outputted from the sub mach-Zehnder waveguide. In reality, a carrier wave (a carrier signal) or a high order component (e.g., a second order component ($f_0 \pm 2f_m$)) is contained in the optical signal. The optical switch system operates to suppress at least one of them.

In other words, the phases of a carrier wave (a carrier signal) and a high order component (e.g., a second order component ($f_0 \pm 2f_m$)) of optical signals outputted from each sub Mach-Zehnder waveguide are decided by phase or bias voltage of signals applied to each sub Mach-Zehnder waveguide. Therefore, components to be suppressed are effectively suppressed by adjusting phases of output signals from each sub Mach-Zehnder waveguide so that the phases of components to be suppressed (a carrier wave (a carrier signal) of an optical signal or a high order component (e.g., a second order component ($f_0 \pm 2f_m$)) are reversed before combined at the combining part.

Optical Switch System Having Optical Intensity Compensation Mechanism

Figure 6:
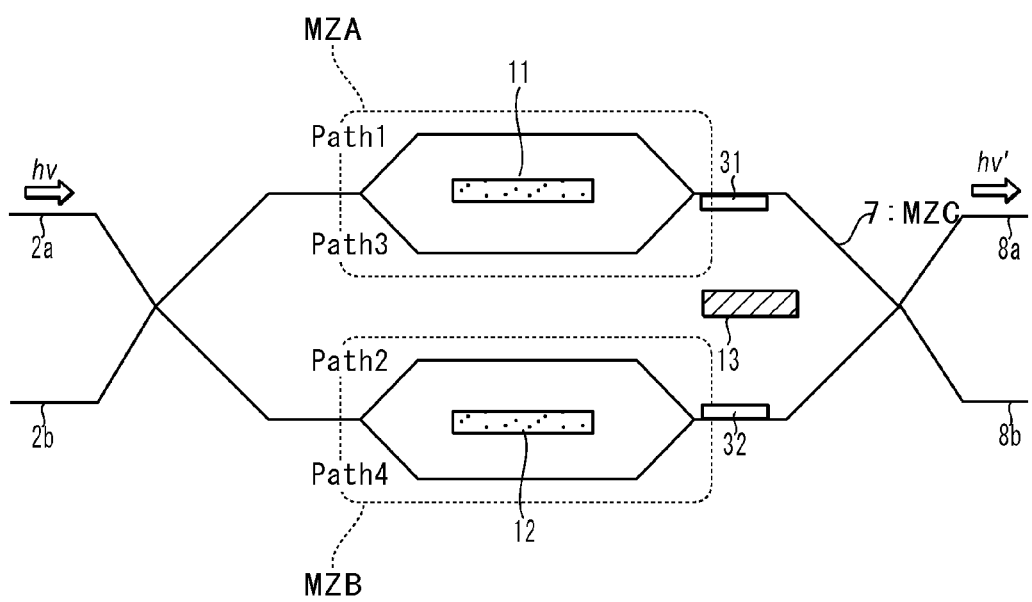
FIG. 6 is a schematic diagram showing a basic arrangement of an optical switch system having optical intensity compensation mechanisms.

FIG. 6 is a schematic diagram showing a basic arrangement of an optical switch system having an optical intensity compensation mechanism. As shown in FIG. 6, the optical switch system having an optical intensity compensation mechanism relates to the above described optical switch system which further comprises either one or both of an optical intensity compensation mechanism (31) and an optical intensity compensation mechanism (32). The optical intensity compensation mechanism (31) is provided along the first arm (4) between the first intensity modulator (9) and the combining part (6). The optical intensity compensation mechanism (32) is provided along the second arm (5) between the second intensity modulator (10) and the combing part (6).

As shown in FIG. 6, since the optical switch system comprises the optical intensity compensation mechanisms (e.g., intensity modulators), the optical switch system can adjust the intensities of components to be suppressed to the same level effectively. Therefore, by adjusting these components to have reversed phases, these components can be effectively suppressed. And, as far as the phase control is concerned, an arrangement of the optical switch system above explained may be adopted.

Optical Switch System Having Bias Adjustment Function—1—

An optical switch system having bias adjustment function is explained in the following. The optical switch system having bias adjustment function comprises a control part which is connected to a detecting part of an output signal from the main Mach-Zehnder waveguide (7). The control part outputs control signals to the signal sources (14, 15). And the control part (i) adjusts voltage applied to the first electrode (electrode A) (9), the second electrode (electrode B) (10), and the third electrode (electrode C) (13) so as to increase output from the main Mach-Zehnder waveguide (7), (ii) adjusts bias voltage applied to the third electrode (electrode C) (13) so as to decrease output from the main Mach-Zehnder waveguide (7), (iii) decreases bias voltage of either one of the sub Mach-Zehnder electrodes so as to decrease output from the main Mach-Zehnder waveguide (7), and (iv) adjusts bias voltage applied to the third electrode (electrode C) (13) so as to decrease output from the main Mach-Zehnder waveguide (7).

When a main Mach-Zehnder waveguide having X-branched branching part is adopted the main Mach-Zehnder waveguide (7), bias voltage may be adjusted by monitoring output of either one of the output parts (8*a*, 8*b*) of the main Mach-Zehnder waveguide (7).

In particular, the optical switch system may further comprise a control part which is connected to a detecting part of an output signal from the main Mach-Zehnder waveguide (7). The control part outputs control signals to the signal sources (14, 15). And the control part (i) adjusts voltage applied to the first electrode (electrode A) (9), the second electrode (electrode B) (10), and the third electrode (electrode C) (13) so as to increase output from either one of the output parts (8*a*, 8*b*) of the main Mach-Zehnder waveguide (7), (ii) adjusts bias voltage applied to the third electrode (electrode C) (13) so as to decrease output from either one of the output parts (8*a*, 8*b*) of the main Mach-Zehnder waveguide (7), (iii) decreases bias voltage of either one of the sub Mach-Zehnder electrodes so as to decrease output from either one of the output parts (8*a*, 8*b*) of the main Mach-Zehnder waveguide (7), and (iv) adjusts bias voltage applied to the third electrode (electrode C) (13) so as to decrease output from either one of the output parts (8*a*, 8*b*) of the main Mach-Zehnder waveguide (7).

In case of an X-branched Mach-Zehnder waveguide, if an intensity of one output part is high, an intensity of the other output part becomes low.

Therefore, an optical switch system may further comprise a control part which is connected to a detecting part of an output signal from the main Mach-Zehnder waveguide (7). The control part outputs control signals to a signal sources (14, 15). And the control part (i) adjusts voltage applied to the first electrode (electrode A) (9), the second electrode (electrode B) (10), and the third electrode (electrode C) (13) so as to decrease output from either one of the output parts (8a, 8b) of the main Mach-Zehnder waveguide (7), (ii) adjusts bias voltage applied to the third electrode (electrode C) (13) so as to increase output from either one of the output parts (8a, 8b) of the main Mach-Zehnder waveguide (7), (iii) decreases bias voltage of either one of the sub Mach-Zehnder electrodes so as to increase output from either one of the output parts (8a, 8b) of the main Mach-Zehnder waveguide (7), and (iv) adjusts bias voltage applied to the third electrode (electrode C) (13) so as to increase output from either one of the output parts (8a, 8b) of the main Mach-Zehnder waveguide (7).

Moreover, since the third electrode of the optical switch system may be a two-electrode type one, the system may comprise a third electrode (electrode C) (13) having either one or both of: an electrode ($MZ_{CA}$ electrode) (13a) which is provided along a waveguide portion between a combining part of the first sub Mach-Zehnder waveguide ($MZ_A$) (9) and the combining part (6) of the main Mach-Zehnder waveguide ($MZ_C$) (7); and an electrode ($MZ_{CB}$ electrode) (13b) which is provided along a waveguide portion between a combining part of the second sub Mach-Zehnder waveguide ($MZ_B$) (10) and the combining part (6) of the main Mach-Zehnder waveguide ($MZ_C$) (7).

And the system further comprises a control part which is connected to a detecting part of an output signal from either one of the output parts (8a, 8b) of the main Mach-Zehnder waveguide (7). The control part outputs control signals to the signal sources (14, 15). And the control part (i) adjusts voltage applied to the first electrode (electrode A) (9), the second electrode (electrode B) (10), the $MZ_{CA}$ electrode, and the $MZ_{CB}$ electrode so as to increase output from either one of the output parts (8a, 8b) of the main Mach-Zehnder waveguide (7), (ii) adjusts bias voltage applied to the $MZ_{CA}$ electrode and the $MZ_{CB}$ electrode so as to decrease output from either one of the output parts (8a, 8b) of the main Mach-Zehnder waveguide (7), (iii) decreases bias voltage of either one of the sub Mach-Zehnder electrodes so as to decrease output from either one of the output parts (8a, 8b) of the main Mach-Zehnder waveguide (7), and (iv) adjusts bias voltage applied to the $MZ_{CA}$ electrode and the $MZ_{CB}$ electrode so as to decrease output from either one of the output parts (8a, 8b) of the main Mach-Zehnder waveguide (7).

In addition, the optical switch system may further comprise a third electrode (electrode C) (13) having either one or both of: an electrode ($MZ_{CA}$ electrode) (13a) which is provided along a waveguide portion between a combining part of the first sub Mach-Zehnder waveguide ($MZ_A$) (9) and the combining part (6) of the main Mach-Zehnder waveguide ($MZ_C$) (7); and an electrode ($MZ_{CB}$ electrode) (13b) which is provided along a waveguide portion between a combining part of the second sub Mach-Zehnder waveguide ($MZ_B$) (10) and the combining part (6) of the main Mach-Zehnder waveguide ($MZ_C$) (7)

And the system further comprises a control part which is connected to a detecting part of an output signal from either one of the output parts (8a, 8b) of the main Mach-Zehnder waveguide (7). The control part outputs control signals to the signal sources (14, 15). And the control part (i) adjusts voltage applied to the first electrode (electrode A) (9), the second electrode (electrode B) (10), the $MZ_{CA}$ electrode, and the $MZ_{CB}$ electrode so as to decrease output from either one of the output parts (8a, 8b) of the main Mach-Zehnder waveguide (7), (ii) adjusts bias voltage applied to the $MZ_{CA}$ electrode and the $MZ_{CB}$ electrode so as to increase output from either one of the output parts (8a, 8b) of the main Mach-Zehnder waveguide (7), (iii) decreases bias voltage of either one of the sub Mach-Zehnder electrodes so as to increase output from either one of the output parts (8a, 8b) of the main Mach-Zehnder waveguide (7), and (iv) adjusts bias voltage applied to the $MZ_{CA}$ electrode and the $MZ_{CB}$ electrode so as to increase output from either one of the output parts (8a, 8b) of the main Mach-Zehnder waveguide (7).

Hereinafter, in case the main Mach-Zehnder waveguide (7) is X-branched, an optical output from either one of the output parts (8a, 8b) of the main Mach-Zehnder waveguide (7) is monitored. As above explained, "one of the output parts (8a, 8b)" includes a light path leaking out of a substrate.

This optical switch system having bias adjustment function is preferably able to obtain a desirable bias voltage automatically by a bias adjustment method comprising the steps of: (i) adjusting voltage applied to the first electrode (electrode A) (9), the second electrode (electrode B) (10), and the third electrode (electrode C) (13) so as to increase output from the main Mach-Zehnder waveguide (7); (ii) adjusting bias voltage applied to the third electrode (electrode C) (13) so as to decrease output from the main Mach-Zehnder waveguide (7); (iii) decreasing bias voltage of either one of the sub Mach-Zehnder electrodes so as to decrease output from the main Mach-Zehnder waveguide (7); and (iv) adjusting bias voltage applied to the third electrode (electrode C) (13) so as to decrease output from the main Mach-Zehnder waveguide (7).

By using bias voltage thus adjusted, in other words, by using a signal with relatively less carrier components or relatively less high order components which are in turn suppressed by the method above explained, the components to be suppressed can be suppressed more effectively.

Hereinafter, an extinction ratio modulation method using an optical switch system having bias adjustment function is explained. The method basically includes the steps of (i) adjusting bias voltage of the main Mach-Zehnder electrode (electrode C) and bias voltage of the two sub Mach-Zehnder electrodes so as to increase output from the main Mach-Zehnder waveguide; (ii) adjusting bias voltage of the electrode C so as to decrease output from the main Mach-Zehnder waveguide; (iii) decreasing bias voltage of either one of the sub Mach-Zehnder electrodes so as to decrease output from the main Mach-Zehnder waveguide; and (iv) adjusting bias voltage of the electrode C so as to decrease output from the main Mach-Zehnder waveguide. Note that it is a preferred embodiment of the present invention to repeatedly perform the above step (iii) and the step (iv). Hereinafter, each step is explained.

(i) Step of Adjusting Bias Voltage of the Electrode C and Bias Voltage of the Two Sub Mach-Zehnder Electrodes so as to Increase Output from the Main Mach-Zehnder Waveguide This step adjusts bias voltage of the electrode C and bias voltage of two sub Mach-Zehnder electrodes so that output from the main Mach-Zehnder waveguide is increased (preferably as much as possible, more preferably maximized). Since the main MZ waveguide is, for example, connected to a measurement system, the bias voltage applied to the each Mach-Zehnder electrode may be adjusted by observing output levels of the measurement system.

The measurement system may be connected to a power supply system supplying each bias voltage via a control device, and each bias voltage may be controlled so that optical intensity measured by the measurement system is increased. The control device comprises an input part, an output part, a memory part (including memory and main memory), a computing part. The input part inputs information. The output part outputs information. The memory part stores information. And the computing part such as CPU performs arithmetic operations. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from a controlling program of the main memory, outputs a signal for changing bias voltages applied to either one of or two or more of electrodes from the output part. This process changes the intensity level of output light. The control device, retrieving the information and comparing it to the former optical intensity, outputs an order of changing bias voltages so as to increase the optical intensity from the output part. A power source which received this output signal, based on the order, changes voltage levels applied to each electrode, thereby increasing the optical output.

(ii) Step of Adjusting Bias Voltage of Electrode C so as to Decrease Output from the Main Mach-Zehnder Waveguide This step adjusts bias voltage applied to the main Mach-Zehnder electrode so that intensity of output light from the main Mach-Zehnder waveguide is decreased. Since the main MZ waveguide is connected to a measurement system not shown in figures, the bias voltage applied to the main Mach-Zehnder electrode may be adjusted by observing output levels of the measurement system.

The measurement system may be connected to a power supply system supplying bias voltage to the main Mach-Zehnder electrode via a control device, and the bias voltage may be controlled so that optical intensity measured by the measurement system is decreased. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from the controlling program of the main memory, outputs a signal for changing bias voltages applied to the main Mach-Zehnder electrode from the output part. This process changes the intensity level of output light. The control device, retrieving the information and comparing it to the former optical intensity, outputs an order of changing bias voltages so as to decrease the optical intensity from the output part. A power source which received this output signal, based on the order, changes voltage levels applied to the main Mach-Zehnder electrode, thereby decreasing the optical output.

(iii) Step of Decreasing Bias Voltage of Either One of the Sub Mach-Zehnder Electrodes so as to Decrease Output from the Main Mach-Zehnder Waveguide In this step, bias voltage of either one of the sub Mach-Zehnder electrodes is decreased so that output from the main Mach-Zehnder waveguide is decreased. In this step, if bias voltage of either one of the sub Mach-Zehnder electrodes is decreased, output from the main Mach-Zehnder waveguide will be decreased. Therefore, bias voltage of the sub Mach-Zehnder electrode, to which output from the main Mach-Zehnder waveguide is decreased, is adjusted to be decreased. In this step, voltage level to be increased or decreased may be predetermined. A range of voltage level change is, for example, from 0.01V to 0.5V, and is preferably from 0.05V to 0.1V. By this step, output intensity from the main Mach-Zehnder is decreased. Since the main Mach-Zehnder waveguide is, for example, connected to a measurement system not shown in figures, the bias voltage may be adjusted by observing output levels of the measurement system.

The measurement system may be connected to a power supply system supplying bias voltage to the electrode A and the electrode B via a control device, and the bias voltage applied to the electrode A or the electrode B may be controlled. In this case, information on an electrode whose voltage level is changed and information on voltage level to be changed may be stored in a memory and the like. The CPU of the control device, based on an order from a controlling program of the main memory, retrieves control information from the memory, and outputs a signal for changing bias voltage applied to the electrode A and electrode B. This changes bias voltage applied to the electrode A or the electrode B by a certain amount. And if the bias voltage applied to the electrode A or the electrode B changes by a certain amount, intensity of an optical signal from the main Mach-Zehnder will change. The information on optical intensity observed by the measurement system is inputted from the input part and stored in the memory. The CPU of the control device, based on an order from the controlling program of the main memory, retrieves information on optical intensity stored in the memory, outputs an order from the output part. The order is to change bias voltages applied to the sub Mach-Zehnder electrodes so as to decrease optical intensity from the main Mach-Zehnder waveguide. The power source, having received this output signal, changes the voltage level applied to electrodes based on the order, thereby decreasing optical output.

(iv) Step of Adjusting Bias Voltage of the Electrode C so as to Decrease Output of the Main Mach-Zehnder Waveguide This step adjusts bias voltage of electrode C so as to decrease output of the main Mach-Zehnder waveguide. Since the main MZ waveguide is connected to a measurement system not shown in figures, for example, the bias voltage may be adjusted by observing output levels of the measurement system. It is to be noted that this step or the above step (iii) and this step may be repeatedly performed.

The measurement system may be connected to a power supply system supplying bias voltage to the electrode C via a control device, and bias voltage applied to the electrode C may be controlled. The CPU of the control device, based on an order from a controlling program of the main memory, retrieves control information from the memory, and outputs a signal for changing bias voltage applied to the electrode C from the output part. This changes bias voltage applied to the electrode C by a certain amount.

Also, the CPU of the control device, based on an order from a controlling program of the main memory, retrieves control information or information on output light from the memory, and may make a decision to stop adjusting bias voltage. To the contrary, the CPU may keep adjusting bias voltage by feeding back intensity information of an output light from the measurement system.

Optical Switch System Having Bias Adjustment Function—2—

The other optical switch system having bias adjustment function is basically based on the following idea.

By providing a bias voltage control part for controlling bias voltage applied to each bias electrode to an optical switch system, the most desirable bias voltage level and a preferable operating environment can be obtained even when the system is in operation.

An optical switch system having bias adjustment function further comprises: a first bias adjusting means for adjusting bias voltage applied to the electrode A and the electrode B so as to maximize an intensity of the optical signal outputted from the main Mach-Zehnder waveguide; and a second bias adjusting means for adjusting bias voltage applied to the electrode C, wherein the bias voltage is adjusted so that, assuming the intensity of the optical signal is Max, an intensity of the optical signal outputted from the main Mach-Zehnder waveguide is in between 40% to 60%, both inclusive, of the Max (preferably half of the Max), while the bias voltage applied to the electrode A and the electrode B is kept to be the same level as the one obtained in the first bias adjusting means.

In case of a main Mach-Zehnder waveguide (7) having X-branched branching part, bias voltage may be adjusted by monitoring output of either one of the output parts (8a, 8b) of the main Mach-Zehnder waveguide (7). In particular, the following optical switch system can be used. That is, an optical switch system having bias adjustment function comprises: a first bias adjusting means for adjusting bias voltage applied to the electrode A and the electrode B so as to maximize an intensity of the optical signal outputted from either one of the output parts (8a, 8b) of the main Mach-Zehnder waveguide; and a second bias adjusting means for adjusting bias voltage applied to the electrode C, wherein the bias voltage is adjusted so that, assuming the intensity of the optical signal is Max, an intensity of the optical signal outputted from either one of the output parts (8a, 8b) of the main Mach-Zehnder waveguide is in between 40% to 60%, both inclusive, of the Max, while the bias voltage applied to the electrode A and the electrode B is kept to be the same level as the one obtained in the first bias adjusting means.

Since the optical switch system having bias adjustment function has the above arrangement, in addition to the benefit of the optical FSK modulation system according to the first aspect of the present invention, a bias voltage controlling part, as each bias adjusting means, adjusts bias voltage applied to the each electrode from the signal source while receiving information from a photodetector which detects optical signals outputted from each sub Mach-Zehnder waveguide. Therefore, the optical switch system can adjust bias voltage level to the most preferable level automatically.

The other preferred embodiment of the optical switch system having bias adjustment function relates to the above described optical switch system having bias adjustment function which further comprises a third bias adjusting means, instead of the second bias adjusting means. The third bias adjusting means applies a dithering signal as a bias voltage to the main Mach-Zehnder electrode, while the bias voltage applied to the sub Mach-Zehnder waveguide is kept to be the same level as the one obtained in the first bias adjusting means. The third bias adjusting means adjusts bias voltage of the main Mach-Zehnder electrode so that an output of a dithering signal component is maximized.

The bias voltage control part is realized by a computer including a computer readable recording media which act as the first bias modulation means and the second bias modulation means. The first bias modulation means outputs a control signal for adjusting bias voltage applied to each sub Mach-Zehnder waveguide so that the intensity of the optical signal outputted from the main Mach-Zehnder waveguide is maximized. And the second bias adjusting means outputs a control signal for adjusting bias voltage applied to the main Mach-Zehnder electrode so that, when the intensity of the optical signal is represented by Max, an intensity of the optical signal outputted from the main Mach-Zehnder waveguide is in between 40% to 60%, both inclusive, of the Max, while the bias voltage applied to the sub Mach-Zehnder waveguide is kept to be the same level as the one obtained in the first bias adjusting means.

The above each means is implemented in a computer and the like which comprises an input device, a memory part, a computing part, a control part and an output part. The input device inputs measured value from the measurement system. The memory part stores the measured value inputted from the input device. The computing part compares the measured value stored in the memory part. The control part, following the input information from the input device, reads a control program stored in the main memory, retrieves each measured value stored in the memory part, and performs a certain control. And an output part outputs a direction on the bias voltage to the signal source based on the computing result from the computing part.

Instead of the second bias adjusting means, the bias voltage control part may contain a third bias adjusting means, which adjusts the bias voltage of the main Mach-Zehnder electrode so that an output of a dithering signal component is maximized by applying a dithering signal as a bias voltage to the main Mach-Zehnder electrode, while the bias voltage applied to the sub Mach-Zehnder waveguide is kept to be the same level as the one obtained in the first bias adjusting means. The dithering signal may be generated by the second bias modulation means with a dithering generation circuit which performs a dithering processing to a staircase wave signal.

For example, by performing m times of dithering to n steps of staircase wave, the number of steps of the staircase wave becomes (n times m), enhancing the comparative accuracy of the staircase wave signal without increasing the number of steps of the frequency. A dithering generation circuit, for example, includes a feedback frequency divider (abbr. as DIV) and a modulation circuit.

The dithering generation circuit, for example, operates as follows. An output frequency of a voltage controlled oscillator (VCO) is supplied to an output terminal and a feedback frequency divider. On the other hand, the modulation circuit receives reference input signal R, generates frequency which gives a certain cycle of fluctuation to an output frequency, and supplies the output frequency to the feedback frequency divider. The feedback frequency divider changes the frequency dividing ratio in the range of about 1% by an output from the modulation circuit in a certain cycle. And then, an output of the feedback frequency divider is supplied to a phase comparison circuit. Thus, a dithering signal is generated.

Also, the bias voltage control part may further include the fourth bias adjusting means for outputting a control signal. The control signal adjusts bias voltage applied to each sub Mach-Zehnder waveguide so that the intensity of the optical signal outputted from each sub Mach-Zehnder waveguide is maximized, while the bias voltage applied to the main Mach-Zehnder electrode is kept to be the same level as the one obtained by the second or the third bias adjusting means.

The optical switch system of the present invention may control a phase of the output signal by adjusting bias voltage applied to the main Mach-Zehnder electrode. In this case, in addition to the ordinary operation of the FSK modulation, the bias voltage is applied to the main Mach-Zehnder electrode, thereby obtaining a phase adjusted FSK modulation signal.

Hereinafter, the bias adjusting process according to this embodiment of the present invention is explained. The first bias adjusting step is for adjusting bias voltage of each MZ waveguide so as to maximize an intensity of an optical signal outputted from the main MZ waveguide. In this step, the bias voltage of the electrode C and the two sub MZ electrode is adjusted so as to increase the output from the main MZ waveguide (preferably increased as much as possible, more preferably maximized). Since the main MZ waveguide is connected to a measurement system not shown in figures, the bias voltage applied to each MZ electrode may be adjusted by observing output levels of the measurement system. It is to be noted that "the maximum output" is not in a strict sense of the word, but is the maximum level when each bias voltage is changed in, for example, 5 to 100V. It may also be the maximum level of the samples performed in about 1 to 10V interval.

The measurement system may be connected to a power supply system providing each bias voltage via a control device, and each bias voltage may be controlled so that an optical intensity measured by the measurement system is increased. The control device comprises an input part, an output part, a memory part (including memory and main memory), a computing part, and a control part. The input part inputs information. The output part outputs information. The memory part stores information. And the computing part, such as CPU, performs arithmetic operations or controls. Information on optical intensity measured by the measurement system is inputted to the control device by the input part, and stored in the memory. The CPU of the control device, based on a direction from a controlling program of the main memory, retrieves the information on optical intensity from the memory. Also, the CPU of the control device, based on a direction from a controlling program of the main memory, outputs a signal changing bias voltages applied to either one of or two or more of electrodes from the output part. This process changes the intensity level of output light. The control device, retrieving the information and comparing it to the former optical intensity, outputs a direction of changing bias voltages so as to increase the optical intensity from the output part. A power source which received this output signal, based on the direction, changes voltage levels applied to each electrode, thereby increasing the optical output.

The second bias adjusting step is for adjusting bias voltage applied to the main Mach-Zehnder electrode. The bias voltage is adjusted so that, when the intensity of the optical signal observed in the first bias adjusting step is represented by Max, an intensity of the optical signal outputted from the main Mach-Zehnder waveguide is in between 40% to 60%, both inclusive, (preferably half) of the Max, while the bias voltage applied to each sub Mach-Zehnder waveguide is kept to be the same level as the one obtained in the first bias adjusting step.

The voltage control part outputs a direction to maintain bias voltage applied to each sub MZ waveguide at the same level as the one obtained in the first bias adjusting step. Following the direction, the signal source maintains the bias voltage applied to each sub MZ waveguide at a fixed level. The voltage control part, on the other hand, observes an intensity of the optical signal outputted from the main MZ waveguide, compares it to the Max, and outputs a direction to adjust the bias voltage applied to the main MZ electrode. Having received the direction, the signal source adjusts the bias voltage applied to the main MZ waveguide.

Specifically, information on optical intensity measured by the measurement system is inputted to the control device by the input part, and stored in the memory. The CPU of the control device, based on a direction from a controlling program of the main memory, retrieves information on optical intensity from the memory. Also, the CPU of the control device, based on a direction from the controlling program of the main memory, outputs a signal changing the bias voltage applied to the main MZ electrode from the output part. By ding this, the intensity level of output light changes. The control device, retrieving the information and comparing it to the former optical intensity, outputs a direction of changing the bias voltage so as to increase the optical intensity from the output part. The bias signal source which received this output signal, based on the direction, changes voltage levels applied to the main MZ electrode, thereby reducing the intensity of the optical signal from the main MZ waveguide. When the intensity of the output signal from the main MZ waveguide reaches a predetermined level such as one in between 40% to 60%, both inclusive, (preferably half) of the Max, this step is terminated, and the next step will be performed.

The third bias adjusting step is an optional step for adjusting bias voltage applied to each sub Mach-Zehnder waveguide. The bias voltage is adjusted so as to maximize the intensity of the optical signal outputted from each sub MZ waveguide, while the bias voltage applied to the main Mach-Zehnder electrode is kept to be the same level as the one obtained in the second bias adjusting step.

The voltage control part outputs a direction to maintain the bias voltage applied to the main MZ electrode at the same level as the one obtained in the second bias adjusting step. Following the direction, the bias signal source maintains the bias voltage applied to the main MZ electrode at the same level as the one obtained in the second bias adjusting step. The voltage control part, on the other hand, observes an intensity of the optical signal outputted from each sub MZ waveguide, outputs a direction to adjust the bias voltage applied to each sub MZ electrode so as to maximize the each observed level. Having received the direction, the signal source adjusts the bias voltage applied to each sub MZ waveguide.

Specifically, information on optical intensity measured by the measurement system is inputted to the control device by the input part, and stored in the memory. The CPU of the control device, based on a direction from a controlling program of the main memory, retrieves the information on optical intensity from the memory. Also, the CPU of the control device, based on a direction from the controlling program of the main memory, outputs a signal changing the bias voltage applied to each sub MZ electrode from the output part. By ding this, the intensity level of output light changes. The control device, retrieving the information and comparing it to the optical intensity so far stored, outputs a direction of changing the bias voltage so as to maximize the optical intensity from the output part. The bias signal source which received this output signal, based on the direction, changes voltage levels applied to each sub MZ electrode, thereby changing the intensity of the optical signal from each sub MZ waveguide. When the intensity of the output signal from the both of the sub MZ waveguide reaches the maximum level, this step is terminated, thereby obtaining an appropriate bias voltage.

Another embodiment of the present invention is as follows. Instead of the second bias adjusting step, applying a dithering signal (minute vibration signal) as a bias voltage to the main MZ electrode and adjusting the bias voltage of the main Mach-Zehnder electrode so as to maximize an output of a dithering signal component, while the bias voltage applied to the sub Mach-Zehnder waveguide is kept to be the same level as the one obtained in the first bias adjusting step.

The optical switch system according to the other aspect of the present invention is the system above described which further comprises a control part for controlling a signal source which applies signals to the first electrode (9), the second electrode (10), and the main Mach-Zehnder electrode (electrode C) (11), wherein the control part makes the signal source (i) adjusts bias voltage applied to the main Mach-Zehnder waveguide ($MZ_A$), and bias voltage applied to the first sub Mach-Zehnder waveguide ($MZ_A$) and the second sub Mach-Zehnder waveguide ($MZ_B$) so that an output from the main Mach-Zehnder waveguide ($MZ_C$) is increased, (ii)

adjusts bias voltage applied to the main Mach-Zehnder waveguide ($MZ_C$), so that an output from the main Mach-Zehnder waveguide ($MZ_C$) is decreased, (iii) decreases bias voltage of either one of the first sub Mach-Zehnder waveguide ($MZ_A$) or the second sub Mach-Zehnder waveguide ($MZ_B$) so that an output from the main Mach-Zehnder waveguide ($MZ_C$) is decreased, (iv) adjusts bias voltage applied to the main Mach-Zehnder waveguide ($MZ_C$), so that an output from the main Mach-Zehnder waveguide ($MZ_C$) is decreased.

The optical switch system of this embodiment can properly adjust bias voltage applied to each electrode. Therefore, a carrier component ($f_0$) or a high order component (e.g., a second order component ($f_0 \pm 2f_m$)) and the like are able to be suppressed, thereby a higher extinction ratio can be achieved. The bias adjusting method of the optical FSK modulation system according to this aspect basically includes the following steps of: (i) adjusting bias voltage of the main Mach-Zehnder electrode (electrode C) and bias voltage of the two sub Mach-Zehnder electrodes so as to increase output from the main Mach-Zehnder waveguide ($MZ_C$); (ii) adjusting bias voltage of the electrode C so as to decrease output from the main Mach-Zehnder waveguide ($MZ_C$); (iii) decreasing bias voltage of either one of the sub Mach-Zehnder electrodes so as to decrease output from the main Mach-Zehnder waveguide ($MZ_C$); and (iv) adjusting bias voltage of the electrode C so as to decrease output from the main Mach-Zehnder waveguide ($MZ_C$). Note that it is a preferred embodiment of the present invention to repeatedly perform the above step (iii) and the step (iv). Hereinafter, each step is explained.

(i) Step of Adjusting Bias Voltage of the Electrode C and Bias Voltage of the Two Sub Mach-Zehnder Electrodes so as to Increase Output from the Main Mach-Zehnder Waveguide This step adjusts bias voltage of the electrode C and bias voltage of two sub Mach-Zehnder electrodes so that output from the main Mach-Zehnder waveguide is increased (preferably as much as possible, more preferably maximized). Since the main MZ waveguide is, for example, connected to a measurement system, the bias voltage applied to the each Mach-Zehnder electrode may be adjusted by observing output levels of the measurement system.

The measurement system may be connected to a power supply system supplying each bias voltage via a control device, and each bias voltage may be controlled so that optical intensity measured by the measurement system is increased. The control device comprises an input part, an output part, a memory part (including memory and main memory), a computing part. The input part inputs information. The output part outputs information. The memory part stores information. And the computing part such as CPU performs arithmetic operations. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from a controlling program of the main memory, outputs a signal for changing bias voltages applied to either one of or two or more of electrodes from the output part. This process changes the intensity level of output light. The control device, retrieving the information and comparing it to the former optical intensity, outputs an order of changing bias voltages so as to increase the optical intensity from the output part. A power source which received this output signal, based on the order, changes voltage levels applied to each electrode, thereby increasing the optical output.

(ii) Step of Adjusting Bias Voltage of Electrode C so as to Decrease Output from the Main Mach-Zehnder Waveguide This step adjusts bias voltage applied to the main Mach-Zehnder electrode so that intensity of output light from the main Mach-Zehnder waveguide is decreased. Since the main MZ waveguide is connected to a measurement system not shown in figures, the bias voltage applied to the main Mach-Zehnder electrode may be adjusted by observing output levels of the measurement system.

The measurement system may be connected to a power supply system supplying bias voltage to the main Mach-Zehnder electrode via a control device, and the bias voltage may be controlled so that optical intensity measured by the measurement system is decreased. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from the controlling program of the main memory, outputs a signal for changing bias voltages applied to the main Mach-Zehnder electrode from the output part. This process changes the intensity level of output light. The control device, retrieving the information and comparing it to the former optical intensity, outputs an order of changing bias voltages so as to decrease the optical intensity from the output part. A power source which received this output signal, based on the order, changes voltage levels applied to the main Mach-Zehnder electrode, thereby decreasing the optical output.

(iii) Step of Decreasing Bias Voltage of Either One of the Sub Mach-Zehnder Electrodes so as to Decrease Output from the Main Mach-Zehnder Waveguide In this step, bias voltage of either one of the sub Mach-Zehnder electrodes is decreased so that output from the main Mach-Zehnder waveguide is decreased. In this step, if bias voltage of either one of the sub Mach-Zehnder electrodes is decreased, output from the main Mach-Zehnder waveguide will be decreased. Therefore, bias voltage of the sub Mach-Zehnder electrode, to which output from the main Mach-Zehnder waveguide is decreased, is adjusted to be decreased. In this step, voltage level to be increased or decreased may be predetermined. A range of voltage level change is, for example, from 0.01V to 0.5V, and is preferably from 0.05V to 0.1V. By this step, output intensity from the main Mach-Zehnder is decreased. Since the main Mach-Zehnder waveguide is connected to a measurement system not shown in figures, the bias voltage may be adjusted by observing output levels of the measurement system.

The measurement system may be connected to a power supply system supplying bias voltage to the electrode A and the electrode B via a control device, and the bias voltage applied to the electrode A or the electrode B may be controlled. In this case, information on an electrode whose voltage level is changed and information on voltage level to be changed may be stored in a memory and the like. The CPU of the control device, based on an order from a controlling program of the main memory, retrieves control information from the memory, and outputs a signal for changing bias voltage applied to the electrode A and electrode B. This changes bias voltage applied to the electrode A or the electrode B by a certain amount. And if the bias voltage applied to the electrode A or the electrode B changes by a certain amount, intensity of an optical signal from the main Mach-Zehnder will change. The information on optical intensity observed by the measurement system is inputted from the input part and stored in the memory. The CPU of the control device, based on an order from the controlling program of the main memory, retrieves information on optical intensity stored in the memory, outputs an order from the output part. The order is to change bias voltages applied to the sub Mach-Zehnder electrodes so as to decrease optical intensity from the main Mach-Zehnder waveguide. The power source, having received this output signal, changes the voltage level applied to electrodes based on the order, thereby decreasing optical output.

(iv) Step of Adjusting Bias Voltage of the Electrode C so as to Decrease Output of the Main Mach-Zehnder Waveguide This step adjusts bias voltage of electrode C so as to decrease output of the main Mach-Zehnder waveguide. Since the main MZ waveguide is connected to a measurement system not shown in figures, for example, the bias voltage may be adjusted by observing output levels of the measurement system. It is to be noted that this step or the above step (iii) and this step may be repeatedly performed.

The measurement system may be connected to a power supply system supplying bias voltage to the electrode C via a control device, and bias voltage applied to the electrode C may be controlled. The CPU of the control device, based on an order from a controlling program of the main memory, retrieves control information from the memory, and outputs a signal for changing bias voltage applied to the electrode C from the output part. This changes bias voltage applied to the electrode C by a certain amount.

Also, the CPU of the control device, based on an order from a controlling program of the main memory, retrieves control information or information on output light from the memory, and may make a decision to stop adjusting bias voltage. To the contrary, the CPU may keep adjusting bias voltage by feeding back intensity information of an output light from the measurement system.

Figure 7:
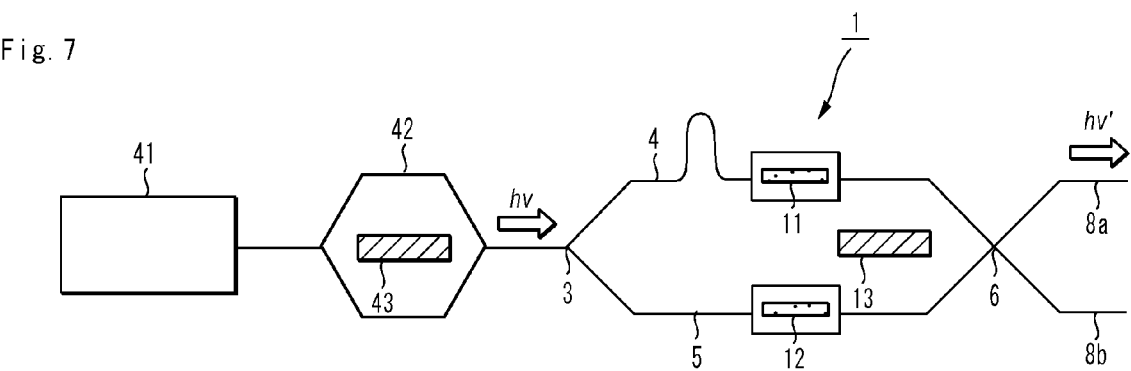
FIG. 7 is a block diagram illustrating a certain embodiment of an optical switch system of the present invention.

FIG. 7 is a block diagram illustrating a certain embodiment of an optical switch system of the present invention. This system, for example, comprises a phase adjuster (41) and the like for adjusting an initial phase of an optical signal, an intensity modulator (42), and one of the above described optical switch systems. The system also includes an intensity modulator 43. The system is an asymmetric Mach-Zehnder waveguide having a first arm (4) and a second arm (5) which are different in length. As an intensity modulator, for example, a DSB-SC modulator can be used, and one including a Mach-Zehnder waveguide and an electrode is preferable.

An optical signal whose initial phase has been adjusted by the phase adjuster (41) is inputted to the intensity modulator (42). And a USB signal and an LSB signal shifted by the frequency of a modulation signal from that of the input signal are outputted. By changing voltage applied to the third electrode (13) of the optical switch system, the output part of the each signal can be switched (e.g., a USB signal is outputted from the output part 8a or the output part 8b). And in case the combining part (6) of the Mach-Zehnder waveguide is Y-branched, a USB signal or an LSB signal can be outputted by changing voltage applied to the third electrode (13). Therefore, the system acts as a filter which cuts off one of the signals.

In the system of this embodiment, the phase adjuster (41) and the intensity modulator (42) act as a continuous phase frequency shift keying modulator. And the intensity modulator (42) acts as an optical frequency shift keying modulator. The continuous phase frequency shift keying modulator according to this embodiment comprises an optical frequency shift keying modulator, a power source system, and an initial phase controller (41). The power source system applies sinusoidal clock signals to the electrode of the optical frequency shift keying modulator, and also applies a baseband signal to the electrode of the optical frequency shift keying modulator. The baseband signal has a predetermined phase difference ($\Delta\phi$) with the sinusoidal clock signal. The phase difference ($\Delta\phi$) is, for example, represented by the following equation (I). The initial phase controller controls a phase of an input light which is inputted to the optical frequency shift keying modulator from a laser light source by encode data synchronized with the baseband signal. And the initial phase controller compensates a phase gap which is generated in the optical frequency shift keying modulator when the baseband signal is switched, and causes a variation in the phase difference ($\Delta\phi$).

$$\Delta\phi = \pi/4n + \pi (n \text{ is an integer}) \quad (I)$$

The continuous phase frequency shift keying modulator (41, 42) according to this embodiment switches a USB signal and an LSB signal by controlling a frequency switching timing. It further controls a phase difference (delay amount) $\Delta\phi$ between a sinusoidal clock signal and a baseband signal so that the phase difference becomes a predetermined phase difference, for example, represented by the above equation (I). And the continuous phase frequency shift keying modulator also synchronizes the baseband signal with an optical signal inputted to the optical intensity modulator which acts as an optical frequency shift keying modulator. Thus, continuous phase frequency shift keying modulation with any shift amount and modulation degree can be realized.

The combination of the above described optical frequency shift keying modulator (42) and the power source, by using synchronous control technique (synchronous modulation method), realized high-speed external modulation which is referred to as a continuous phase frequency shift keying (CPFSK) modulation. Before this synchronous control technique was proposed, direct modulation method for laser diode was the sole method for generating optical CPFSK signals (see for example, K. Iwashita and T. Matsumoto, J. Lightwave. Technol., LT-5, 854-856 (1987); B. Wedding et al., ECOC'03., Th1.5.5 (2003)). Therefore, modulation speed was limited by a reaction speed of the laser diode. In addition, there was a problem that low frequency components of CPFSK signals were decreased because of a thermal coupling effect on the laser diode. The synchronous control technique solves these problems effectively.

On the other hand, the shift amount and the modulation degree of the optical OPFSK modulation signal obtained by the above synchronous control technique has a limitation. In this CPFSK modulation, minimum zero-to-peak frequency shift amount available is estimated to be at least B/2 (B represents bit rate of a CPFSK signal).

In the CPFSK modulation, a frequency shift keying (FSK) modulator based on SSB modulation technique, for example, is used. And the modulator alternatively generates a USB signal or an LSB signal (see for example, T. Kawanishi et al., OFC'04., PDP16 (2004)). The FSK modulator is driven by a sinusoidal clock signal and a baseband signal, and frequency shift and bit rate of an FSK signal are decided respectively by clock frequency $f_0$ of the sinusoidal clock signal and bit rate B of the baseband signal. If this frequency $f_0$ and bit rate B, in accordance with the following equation (II) and synchronized with the CPFSK modulator, are inputted to the CPFSK modulator, CPFSK modulation can be realized without initial phase control explained in details below.

$$\text{Clock frequency } f_0 = nB/2, \Delta\phi = \pm 2\pi/4B \quad (II)$$

Where n is an integer, and $\Delta\phi$ is a delay amount between the clock signal and the base band signal. In this case, however, the minimum frequency shift obtainable is represented by an equation $f_0=B/2$. Thus, there is a limitation of a shift amount and a modulation degree of the optical CPFSK modulation signal obtained by the synchronous control technique. This is because the synchronous control technique allows frequency switching only when the optical phases correspond with each other. Therefore, modulation degree (frequency shift amount) is restricted to be equal to or more than 1, and MSK modulation with modulation degree 0.5 cannot be performed.

In order to realize frequency shift of B/4 and realize MSK modulation, initial phase control which is used with the above described CPFSK modulation is explained below. In particular, for example, continuous phase is realized by controlling an optical initial phase of input light inputted to the optical frequency shift keying modulator at a timing of frequency switching.

In order to realize optical MSK modulation ($f_0=B/4$), the initial phase controller (41) which is connected in series with the CPFSK modulator controls an optical phase by performing bit synchronization with the baseband signal. The initial phase controller (49) compensates for a phase gap generated in the optical intensity modulator (42). By so doing, continuous phase modulation with any frequency shift can be performed. The initial phase controller (41) shifts a phase of an input light by a compensation amount $\delta\phi(t)$ which is represented by the following equation (III), and compensates a phase gap $\delta\phi(t)$ which is generated in the optical frequency shift keying modulator when baseband signals are switched, and which causes a variation in the phase difference ($\Delta\phi$).

$$\delta\phi(t)=\{(2k\pi f_0/B+\phi_0)\bmod 2\pi\} \quad (III)$$

Where k is an integer, $f_0$ is a frequency of a sinusoidal clock signal, B is bit rate of a baseband signal, $\phi_0$ is an initial phase. Note that "mod" function means a reminder operation in which when $(2k\pi f_0/B+\phi_0)$ is divided by $2\pi$, the remainder is $\delta\phi(t)$.

In particular, the optical signal is switched from a USB signal to an LSB signal or vice versa by switching a baseband signal. Then the phase gap $\delta\phi(t)$ which is based on the above equation (III) is generated in the optical intensity modulator (42). So, when the baseband signals are switched, in order to close the phase gap $\delta\phi(t)$ which is known to be generated in advance, the phase of input light is shifted by $\delta\phi(t)$ at the initial phase controller (41), and then the light is inputted to the optical intensity modulator.

In the above equation (III), when $f_0=B/4$, modulation data of four phases, which are $\phi_0+\pi/2$, $\phi_0+\pi$, $\phi_0+3\pi/2$, and $\phi_0+2\pi$, are generated, and the initial phase controller is controlled based on these four data. However, in case of MSK modulation, the initial phase control based on the above equation (III) is simplified according to the encode data which satisfies all the conditions [1] to [4] described below.

Condition [1]: When applying a k-th baseband signal, a baseband signal having a phase difference ($\Delta\phi$) which satisfies a relationship represented by the above equation (I) with a phase of the sinusoidal clock signal is applied to an electrode of the optical frequency shift keying modulator.

Condition [2]: When applying a k-th baseband signal, the phase of the input light is not controlled.

Condition [3]: When applying a k+1-th baseband signal, and the k-th baseband signal and the k+1-th baseband signal are the same, a phase of the input light is not controlled.

Condition [4]: When applying a k+1-th baseband signal, and the k-th baseband signal and the k+1-th baseband signal are different, a phase of the input light is shifted by it.

Where "k"s in condition [1] to [4] are all even numbers or all odd numbers.

Going into details, in case of MSK modulation, since $f_0=B/4$, we have an equation: $\delta\phi(t)=\{(k\pi/2+\phi_0)\bmod 2\pi\}$. This means that a phase gap can be generated every twice application of the baseband signal. In other words, for example, if a phase gap is not generated by even number times of signal application, a phase gap can be generated by odd number times of signal application. It is the case that the baseband signal is switched (between an LSB signal and a USB signal) when this phase gap is generated by the odd number times of signal application. And the phase gap generated at this time is $\pi$. Since the phase gap $\delta\phi$ are not generated by even number times of signal application, phase continuity can be obtained by a control based on the above equation (I) without controlling a phase of an input light (condition [1], [2]). On the other hand, in case of the odd number times of signal application, the phase gap $\pi$ is generated when the baseband signal is switched. Therefore, in case the baseband signal is not switched, phase continuity can be obtained without controlling a phase of an input light, and in case the baseband signal is switched, phase continuity can be obtained by shifting a phase of an input light by $\pi$. (condition [3], [4]).

As shown in the figure, the continuous phase frequency shift keying modulator according to this embodiment has a portion (2, 8) for CPFSK modulation and a portion (41) for initial phase control. As the optical frequency shift keying modulator (42), the power source, and the initial phase controller (41) of the continuous phase frequency shift keying modulator according to this embodiment, publicly known ones used in the field of optical information communication can be used as needed.

As the initial phase controller (41), publicly known phase controllers can be used as needed. For example, a phase controller shown in FIG. 2 of Japanese Patent Application Laid-Open Publication No. H08-79174 can be used. The phase controller comprises a waveguide of LiNbO$_3$ crystal having two electrodes provided on both surfaces of the waveguide. And the phase controller is configured to control a phase of a signal by controlling refractive index of the crystal by applying voltage (a few volts) between the electrodes, and by changing light path length equivalently.

In particular, aforementioned phase controller is adopted as the initial phase controller (41). And the initial phase controller (41) is electrically connected to the power source system via a control device such as a computer not shown in figures. Various signals are inputted to an input device of the computer and outputted from an output device of the computer. A computing means such as a CPU performs phase control based on the above equation (III) by baseband signals from the power source system based on a direction received from a control program of a main memory and memory information and the like read out from a memorizing means such as a memory. The computing means also performs a predetermined operation based on encode data according to phase control satisfying the aforementioned condition [1] to [4].

Then, the CPFSK modulated signal, to which MSK modulation can be performed, is inputted to the switch system (1) of the present invention. And the optical switch system of the present invention acts as a filter extracting desirable optical components. Thus, optical signals with higher quality can be obtained.

Figure 8:
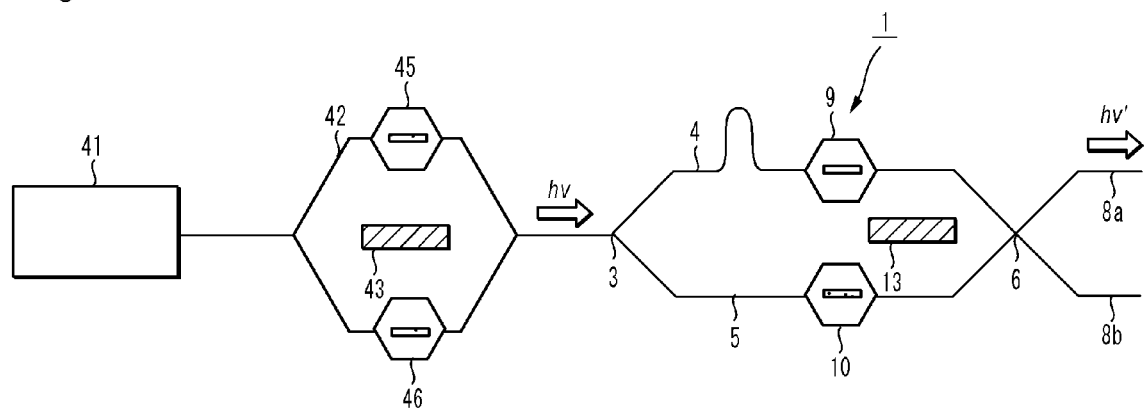
FIG. 8 is a block diagram illustrating a certain embodiment of an optical switch system of the present invention.

FIG. 8 is a block diagram illustrating a certain embodiment of an optical switch system of the present invention. This system, for example, includes a phase modulator (41) and the like for adjusting an initial phase of an optical signal, a Mach- Zehnder type intensity modulator having Mach-Zehnder waveguide (45, 46) on both arms, and one of the above described optical switch system. This intensity modulator (42) acts as an optical frequency shift keying modulator (optical FSK modulator). The system also includes an intensity modulator 43. The optical switch system shown in FIG. 8 is an asymmetric Mach-Zehnder waveguide having a first arm (4) and a second arm (5) which are different in length. As an intensity modulator, for example, a DSB-SC modulator can be used, and one including a Mach-Zehnder waveguide and an electrode is preferable.

FIG. 8 is a block diagram illustrating an improved system of FIG. 7. The system of FIG. 8 acts the same way as the one shown in FIG. 7.

Example 1

Figure 9:
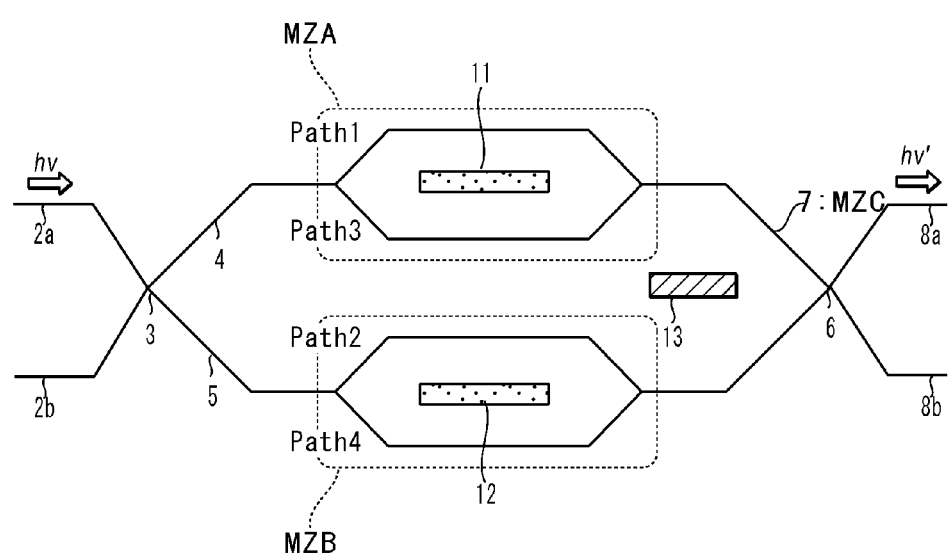
FIG. 9 is a schematic block diagram showing an optical switch system used in a numerical analysis of Example 1.

A theoretical calculation of a relationship between an amplitude variation $((2\Delta C/C)\times 100[\%])$ of the optical switch system shown in FIG. 9 and an extinction ratio $(10 \log(C^2/\Delta C^2))$ is performed. The result is explained below. FIG. 9 is a schematic block diagram showing an optical switch system used in a numerical analysis of Example 1. Reference numbers in the FIG. 9 are identical to the ones explained above.

When an optical amplitude and a phase of the first arm (4) are respectively represented by $C_1$ and $\phi_1$, and those of the second arm (5) are respectively represented by $C_2$ and $\phi_2$. Then, an amplitude ($E_{MZON}$) of an output light (ON light) from one output part (8a) of the main Mach-Zehnder is represented by the following equation.

$$E_{MZON} = \frac{1}{2}[C_1 e^{i\phi_1} + C_2 e^{i\phi_2}] \quad \text{Equation 2}$$
$$= \frac{1}{2}[(C+\Delta C)e^{i(\phi+\Delta\phi)} + (C-\Delta C)e^{i(\phi-\Delta\phi)}]$$
$$= e^{i\phi}[C\cos\Delta\phi + i\Delta C\sin\Delta\phi]$$

On the other hand, an output light from the other output part (8b) (in case the combining part (6) of the main Mach-Zehnder waveguide is Y-branched, elements converted to radiation light (OFF light)) ($E_{MZOFF}$) is represented by the following equation.

$$E_{MZOFF} = e^{i\phi}[iC\sin\Delta\phi + \Delta C\cos\Delta\phi] \quad \text{Equation 3}$$

Note that C, $\Delta C$, $\phi$, and $\Delta\phi$ in the equation 3 is defined as follows.

$$C \equiv \frac{C_1 + C_2}{2} \quad \text{Equation 4}$$
$$\Delta C \equiv \frac{C_1 - C_2}{2}$$
$$\phi \equiv \frac{\phi_1 + \phi_2}{2}$$
$$\Delta\phi \equiv \frac{\phi_1 - \phi_2}{2}$$

$C_1$ and $C_2$ can be adjusted by intensity balance adjustment mechanism of the first arm (4) and the second arm (5). In particular, $C_1$ and $C_2$ can be adjusted by controlling voltage applied to the first electrode (11) and the second electrode (12). On the other hand, $\Delta\phi$ can be adjusted by controlling bias voltage applied to the third electrode (13).

ON light and OFF light are partially coupled on a waveguide. Therefore, the overlapped portion is considered to be a directional coupler having a coupling coefficient $\kappa^{1/2}$ $(=\cos\zeta)$. Then, an amplitude ($E_{ON}$) of an output light (ON light) from one of the output parts (8a) of the main Mach-Zehnder, considering this partial coupling, is represented by the following equation.

$$E_{ON} = e^{i\phi}\begin{bmatrix} C(\sin\zeta\cos\Delta\phi + \cos\zeta\sin\Delta\phi) + \\ i\Delta C(\sin\zeta\sin\Delta\phi - \cos\zeta\cos\Delta\phi) \end{bmatrix} \quad \text{Equation 5}$$
$$= e^{i\phi}[C\sin(\Delta\phi + \zeta) - i\Delta C\cos(\Delta\phi + \varepsilon)]$$

On the other hand, an output light from the other output part (8b) (in case the combining part (6) of the main Mach-Zehnder waveguide is Y-branched, elements converted to a radiation light (OFF light)) ($E_{OFF}$) is represented by the following equation.

$$E_{OFF} = e^{i\phi}[-iC\cos(\Delta\phi+\zeta) + \Delta C\sin(\Delta\phi+\zeta)] \quad \text{Equation 6}$$

Where the directional coupler is represented by the following equation.

$$\begin{bmatrix} E_{ON} \\ E_{OFF} \end{bmatrix} = \begin{bmatrix} \sin\zeta & -i\cos\zeta \\ -i\cos\zeta & \sin\zeta \end{bmatrix} \begin{bmatrix} E_{MZON} \\ E_{MZOFF} \end{bmatrix} \quad \text{Equation 7}$$

Based on the above equation, output light intensity ($|E_{ON}|^2$) from one of the output parts (8a) of the main Mach-Zehnder is represented by the following equation.

$$|E_{ON}|^2 = C^2\cos^2(\Delta\phi+\zeta) + \Delta C^2 \sin^2(\Delta\phi+\zeta) \quad \text{Equation 8}$$
$$= C^2\left[1 - \left(1 - \frac{\Delta C^2}{C^2}\right)\sin^2(\Delta\phi+\zeta)\right]$$

It can be seen from the above equation that when $(\Delta\phi+\zeta)=0$, an output light intensity is maximized ($C^2$), and when $(\Delta\phi+\zeta)=\pi/2$, an output light intensity is minimized ($\Delta C^2$). In case $\zeta$, which is related to a coupling coefficient, is about zero, an output light intensity is maximized when $\Delta\phi=0$, and it is minimized when $\Delta\phi=\pi/2$. Thus, on/off extinction ratio (power ratio) becomes ($C^2/\Delta C^2$).

Therefore, when $\Delta C$ becomes zero by adjusting a balance between the first arm and the second arm, the extinction ratio will be theoretically infinite. But, in reality, the extinction ratio will not be infinite because the balance adjustment is incomplete and because of an influence of a high-order mode which is ignored in the equation 7.

In case the amplitude of the first arm is higher than that of the second arm (i.e., $\Delta C>0$), $1-\eta$ is defined by the following equation.

$$\frac{C - \Delta C}{C + \Delta C} = 1 - \eta \quad \text{Equation 9}$$

Then, an amplitude variation between the first arm and the second arm will be $\eta$. Note that the amplitude variation is compensation amount required for maximizing extinction ratio. And if high-order term which is equal to or higher than second-order is ignored, $\eta$ becomes about $2\Delta C$.

When power is off, a remnant power is $(\eta/2)^2(=\Delta C^2)$. Therefore, it can be seen that half of amplitude difference components are converted to high-order radiation components, and the other half of the components (η/2) are outputed.

Figure 10:
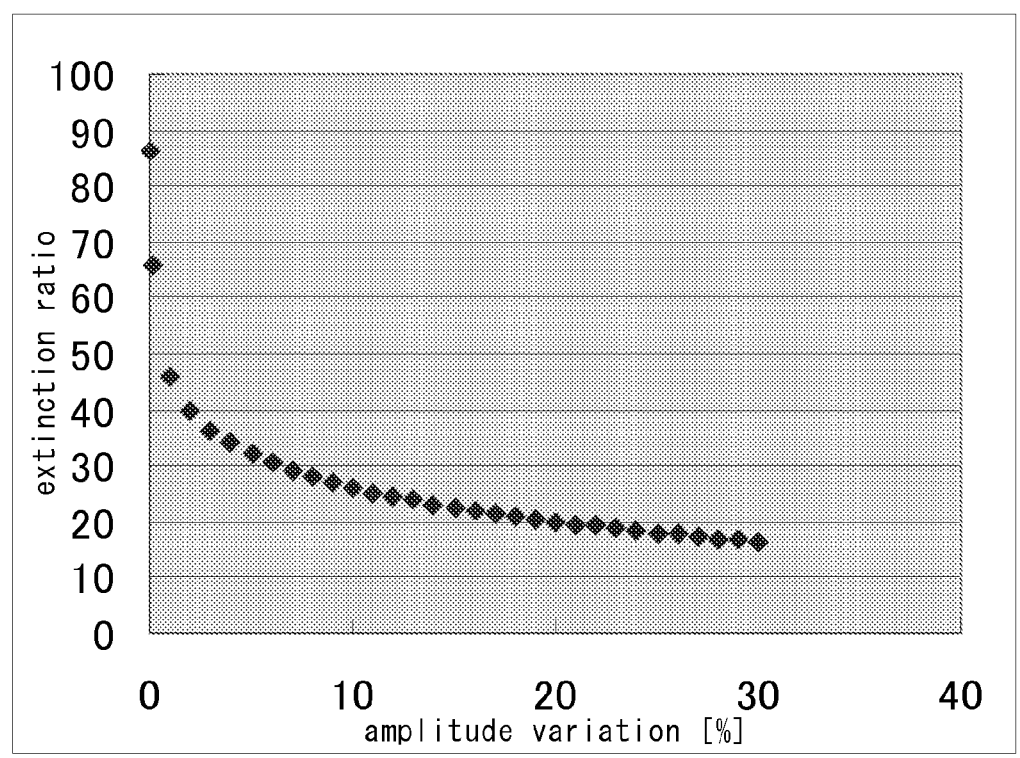
FIG. 10 is a graph showing a calculation result of a relationship between an amplitude variation and an extinction ratio.

Based on the above condition, a theoretical calculation of a relationship between an amplitude variation ($(2\Delta C/C) \times 100$ [%]) and an extinction ratio ($10 \log(C^2/\Delta C^2)$) is performed. The result is illustrated in FIG. 10. FIG. 10 is a graph showing a calculation result of a relationship between an amplitude variation and an extinction ratio. In the FIG. 10, horizontal axis shows the amplitude variation ($(2\Delta C/C) \times 100$[%]), and the vertical axis shows the extinction ratio ($10 \log(C^2/\Delta C^2)$).

It can be seen from the FIG. 10 that a high extinction ratio can be obtained by decreasing the amplitude variation.

The optical switch system of the present invention can be used in the field of optical information communication. Since the optical switch system of the present invention can switch optical paths, the system can be used as an optical switching system that is capable of routing an optical signal as it is.

What is claimed is:

1. An optical switch system comprising:
one or two input parts of an optical signal;
a main Mach-Zehnder waveguide ($MZ_C$) comprising:
   a branching part for branching the optical signal,
   a first arm being a waveguide, wherein an optical signal branched by the branching part propagates,
   a second arm being a waveguide, wherein the other optical signal branched by the branching part propagates, and
   a combining part for combining the optical signals, the optical signals being outputted from the first arm and the second arm;
two output parts for outputting the optical signal, the optical signal being combined by the combining part;
a first intensity modulator being provided on the first arm, the first intensity modulator controlling an amplitude of the optical signal, the optical signal propagating through the first arm;
a second intensity modulator being provided on the second arm, the second intensity modulator controlling an amplitude of the optical signal, the optical signal propagating through the second arm;
a first electrode (electrode A) of the first intensity modulator;
a second electrode (electrode B) of the second intensity modulator;
a third electrode (electrode C) of the main Mach-Zehnder waveguide ($MZ_C$), wherein a modulation signal is applied to the third electrode, the modulation signal controlling a phase difference between optical signals, the optical signals respectively propagating through the first arm and the second arm; and
a signal source part comprising a first signal source and a second signal source, the first signal source applying bias voltage to the first electrode (electrode A), the second electrode (electrode B), and the third electrode (electrode C), the second signal source applying a high-speed electric signal to the third electrode (electrode C),
wherein both of the branching part and the combining part are X-branched when the system has two input parts,
wherein the combining part is X-branched when the system has one input part,
wherein the first intensity modulator is a first sub Mach-Zehnder waveguide ($MZ_A$) comprising the first electrode (electrode A),
wherein the second intensity modulator is a second sub Mach-Zehnder waveguide ($MZ_B$) comprising the second electrode (electrode B), and
the system further comprising:
a control part for adjusting an $RF_A$ signal and an $RF_B$ signal, thereby switching the output parts from which the optical signal is outputted;
wherein the $RF_A$ signal is a high-speed electric signal applied to the optical signal, the optical signal propagating through two arms composing the first sub Mach-Zehnder waveguide ($MZ_A$), and
wherein the $RF_B$ signal is a high-speed electric signal applied to the optical signal, the optical signal propagating through two arms composing the second sub Mach-Zehnder waveguide ($MZ_B$),
wherein the control part is further configured to
   (i) adjust voltage applied to the first electrode, the second electrode, and the first and the second main Mach-Zehnder electrodes so as to increase output from either one of the output parts of the main Mach-Zehnder waveguide,
   (ii) adjust bias voltage applied to the first and the second main Mach-Zehnder electrodes so as to decrease output from either one of the output parts of the main Mach-Zehnder waveguide,
   (iii) decrease bias voltage of either one of the sub Mach-Zehnder electrodes so as to decrease output from either one of the output parts of the main Mach-Zehnder waveguide, and
   (iv) adjust bias voltage applied to the first and the second main Mach-Zehnder electrodes so as to decrease output from either one of the output parts of the main Mach-Zehnder waveguide.

2. The optical switch system as claimed in claim 1,
wherein the third electrode (electrode C) comprises either one or both of:
an electrode ($MZ_{CA}$ electrode) being provided along a waveguide portion, the waveguide portion being between a combining part of the first sub Mach-Zehnder waveguide ($MZ_A$) and the combining part of the main Mach-Zehnder waveguide ($MZ_C$); and
an electrode ($MZ_{CB}$ electrode) being provided along a waveguide portion, the waveguide portion being between a combining part of the second sub Mach-Zehnder waveguide ($MZ_B$) and the combining part of the main Mach-Zehnder waveguide ($MZ_C$).

3. The optical switch system as claimed in claim 1,
wherein the first intensity modulator is a first Mach-Zehnder waveguide ($MZ_A$) comprising the first electrode (electrode A),
wherein the second intensity modulator is a second Mach-Zehnder waveguide ($MZ_B$) comprising the second electrode (electrode B), and
wherein the third electrode (electrode C) comprises either one or both of:
an electrode ($MZ_{CA}$ electrode) being provided along a waveguide portion, the waveguide portion being between a combining part of the first sub Mach-Zehnder waveguide ($MZ_A$) and the combining part of the main Mach-Zehnder waveguide ($MZ_C$); and
an electrode ($MZ_{CB}$ electrode) being provided along a waveguide portion, the waveguide portion being between a combining part of the second sub Mach-Zehnder waveguide ($MZ_B$) and the combining part of the main Mach-Zehnder waveguide ($MZ_C$),
the system further comprising:
a modulation signal applied to the first main Mach-Zehnder electrode ($MZ_{CA}$ electrode), and a modulation signal applied to the second main Mach-Zehnder electrode ($MZ_{CB}$ electrode).

4. The optical switch system as claimed in claim 1, wherein the third electrode (electrode C) comprises either one or both of:

an electrode ($MZ_{CA}$ electrode) being provided along a waveguide portion, the waveguide portion being between a combining part of the first sub Mach-Zehnder waveguide ($MZ_A$) and the combining part of the main Mach-Zehnder waveguide ($MZ_C$); and an electrode ($MZ_{CB}$ electrode) being provided along a waveguide portion, the waveguide portion being between a combining part of the second sub Mach-Zehnder waveguide ($MZ_B$) and the combining part of the main Mach-Zehnder waveguide ($MZ_C$), the system further comprising:

a control part for adjusting voltage applied to the first main Mach-Zehnder electrode ($MZ_{CA}$ electrode) and the second main Mach-Zehnder electrode ($MZ_{CB}$ electrode), the voltage being adjusted so that a phase difference of optical carrier signals or certain high order optical signals become 180 degrees, the optical carrier signals or the certain high order optical signals being contained in output signals from the first intensity modulator and output signals from the second intensity modulator.

5. The optical switch system as claimed in claim 1, wherein the second signal source comprises:

a third harmonic signal generator for generating an electric signal whose frequency is three times the frequency of a basic signal;

a phase adjusting part for adjusting a phase difference between a phase of the basic signal and a phase of the electric signal, the basic signal being outputted from the second signal source, the electric signal being outputted from the third harmonic signal generator, the electric signal having frequency three times the frequency of the basic signal; and a signal intensity adjusting part for adjusting intensity of the basic signal or the electric signal, the basic signal being outputted from the second signal source, the electric signal being generated from the third harmonic signal generator, the electric signal having a frequency three times the frequency of the basic signal.

6. The optical switch system as claimed in claim 1, further comprising either one or both of an optical intensity compensation mechanism and an optical intensity compensation mechanism, the optical intensity compensation mechanism being provided along the first arm between the first intensity modulator and the combining part, the optical intensity compensation mechanism being provided along the second arm between the second intensity modulator and the combing part.

7. The optical switch system as claimed in claim 1, further comprising:

a control part being connected to a detecting part of an output signal from the main Mach-Zehnder waveguide, the control part outputting control signals to the signal sources, wherein the control part (i) adjusts voltage applied to the first electrode (electrode A), the second electrode (electrode B), and the third electrode (electrode C) so as to increase output from the main Mach-Zehnder waveguide, (ii) adjusts bias voltage applied to the third electrode (electrode C) so as to decrease output from the main Mach-Zehnder waveguide, (iii) decreases bias voltage of either one of the sub Mach-Zehnder electrodes so as to decrease output from the main Mach-Zehnder waveguide, and (iv) adjusts bias voltage applied to the third electrode (electrode C) so as to decrease output from the main Mach-Zehnder waveguide.

8. The optical switch system as claimed in claim 1, further comprising:

a control part being connected to a detecting part of an output signal from the main Mach-Zehnder waveguide, the control part outputting control signals to the signal sources, wherein the control part (i) adjusts voltage applied to the first electrode (electrode A), the second electrode (electrode B), and the third electrode (electrode C) so as to decrease output from either one of the output parts of the main Mach-Zehnder waveguide, (ii) adjusts bias voltage applied to the third electrode (electrode C) so as to increase output from either one of the output parts of the main Mach-Zehnder waveguide, (iii) decreases bias voltage of either one of the sub Mach-Zehnder electrodes so as to increase output from either one of the output parts of the main Mach-Zehnder waveguide, and (iv) adjusts bias voltage applied to the third electrode (electrode C) so as to increase output from either one of the output parts of the main Mach-Zehnder waveguide.

9. The optical switch system as claimed in claim 1, wherein the third electrode (electrode C) comprises either one or both of:

an electrode ($MZ_{CA}$ electrode) being provided along a waveguide portion, the waveguide portion being between a combining part of the first sub Mach-Zehnder waveguide ($MZ_A$) and the combining part of the main Mach-Zehnder waveguide ($MZ_C$); and an electrode ($MZ_{CB}$ electrode) being provided along a waveguide portion, the waveguide portion being between a combining part of the second sub Mach-Zehnder waveguide ($MZ_B$) and the combining part of the main Mach-Zehnder waveguide ($MZ_C$), the system further comprising:

a control part being connected to a detecting part of an output signal from the main Mach-Zehnder waveguide, the control part outputting control signals to the signal sources, wherein the control part (i) adjusts voltage applied to the first electrode (electrode A), the second electrode (electrode B), the $MZ_{CA}$ electrode, and the $MZ_{CB}$ electrode so as to increase output from the main Mach-Zehnder waveguide, (ii) adjusts bias voltage applied to the $MZ_{CA}$ electrode and the $MZ_{CB}$ electrode so as to decrease output from the main Mach-Zehnder waveguide, (iii) decreases bias voltage of either one of the sub Mach-Zehnder electrodes so as to decrease output from the main Mach-Zehnder waveguide, and (iv) adjusts bias voltage applied to the $MZ_{CA}$ electrode and the $MZ_{CB}$ electrode so as to decrease output from the main Mach-Zehnder waveguide.

10. The optical switch system as claimed in claim 1,
wherein the third electrode (electrode C) comprises either one or both of:
an electrode ($MZ_{CA}$ electrode) being provided along a waveguide portion, the waveguide portion being between a combining part of the first sub Mach-Zehnder waveguide ($MZ_A$) and the combining part of the main Mach-Zehnder waveguide ($MZ_C$); and
an electrode ($MZ_{CB}$ electrode) being provided along a waveguide portion, the waveguide portion being between a combining part of the second sub Mach-Zehnder waveguide ($MZ_B$) and the combining part of the main Mach-Zehnder waveguide ($MZ_C$),
the system further comprising:
a control part being connected to a detecting part of an output signal from either one of the output parts of the main Mach-Zehnder waveguide, the control part outputting control signals to the signal sources,
wherein the control part
   (i) adjusts voltage applied to the first electrode (electrode A), the second electrode (electrode B), the $MZ_{CA}$ electrode, and the $MZ_{CB}$ electrode so as to increase output from either one of the output parts of the main Mach-Zehnder waveguide,
   (ii) adjusts bias voltage applied to the $MZ_{CA}$ electrode and the $MZ_{CB}$ electrode so as to decrease output from either one of the output parts of the main Mach-Zehnder waveguide,
   (iii) decreases bias voltage of either one of the sub Mach-Zehnder electrodes so as to decrease output from either one of the output parts of the main Mach-Zehnder waveguide, and
   (iv) adjusts bias voltage applied to the $MZ_{CA}$ electrode and the $MZ_{CB}$ electrode so as to decrease output from either one of the output parts of the main Mach-Zehnder waveguide.

11. The optical switch system as claimed in claim 1,
wherein the third electrode (electrode C) comprises either one or both of:
an electrode ($MZ_{CA}$ electrode) being provided along a waveguide portion, the waveguide portion being between a combining part of the first sub Mach-Zehnder waveguide ($MZ_A$) and the combining part of the main Mach-Zehnder waveguide ($MZ_C$); and
an electrode ($MZ_{CB}$ electrode) being provided along a waveguide portion, the waveguide portion being between a combining part of the second sub Mach-Zehnder waveguide ($MZ_B$) and the combining part of the main Mach-Zehnder waveguide ($MZ_C$),
the system further comprising:
a control part being connected to a detecting part of an output signal from either one of the output parts of the main Mach-Zehnder waveguide, the control part outputting control signals to the signal sources,
wherein the control part
   (i) adjusts voltage applied to the first electrode (electrode A), the second electrode (electrode B), the $MZ_{CA}$ electrode, and the $MZ_{CB}$ electrode so as to decrease output from either one of the output parts of the main Mach-Zehnder waveguide,
   (ii) adjusts bias voltage applied to the $MZ_{CA}$ electrode and the $MZ_{CB}$ electrode so as to increase output from either one of the output parts of the main Mach-Zehnder waveguide,
   (iii) decreases bias voltage of either one of the sub Mach-Zehnder electrodes so as to increase output from either one of the output parts of the main Mach-Zehnder waveguide, and
   (iv) adjusts bias voltage applied to the $MZ_{CA}$ electrode and the $MZ_{CB}$ electrode so as to increase output from either one of the output parts of the main Mach-Zehnder waveguide.

12. The optical switch system as claimed in claim 1, further comprising:
a first bias adjusting means for adjusting bias voltage, the bias voltage being applied to the electrode A and the electrode B, the bias voltage being adjusted so as to maximize intensity of the optical signal outputted from the main Mach-Zehnder waveguide; and
a second bias adjusting means for adjusting bias voltage, the bias voltage being applied to the electrode C, the bias voltage being adjusted so that, when the intensity of the optical signal is represented by Max, intensity of the optical signal outputted from the main Mach-Zehnder waveguide is in between 40% to 60%, both inclusive, of the Max, while the bias voltage applied to the electrode A and the electrode B is kept to be the same level as the one obtained in the first bias adjusting means.

13. The optical switch system as claimed in claim 1, further comprising:
a first bias adjusting means for adjusting bias voltage, the bias voltage being applied to the electrode A and the electrode B, the bias voltage being adjusted so as to maximize intensity of the optical signal outputted from either one of the output parts of the main Mach-Zehnder waveguide; and
a second bias adjusting means for adjusting bias voltage, the bias voltage being applied to the electrode C, the bias voltage being adjusted so that, when the intensity of the optical signal is represented by Max, intensity of the optical signal outputted from either one of the output parts of the main Mach-Zehnder waveguide is in between 40% to 60%, both inclusive, of the Max, while the bias voltage applied to the electrode A and the electrode B is kept to be the same level as the one obtained in the first bias adjusting means.

* * * * *